US007925504B2

(12) United States Patent
Tsujikawa

(10) Patent No.: US 7,925,504 B2
(45) Date of Patent: Apr. 12, 2011

(54) SYSTEM, METHOD, DEVICE, AND PROGRAM FOR REMOVING ONE OR MORE SIGNALS INCOMING FROM ONE OR MORE DIRECTIONS

(75) Inventor: Masanori Tsujikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 935 days.

(21) Appl. No.: 11/795,593

(22) PCT Filed: Jan. 4, 2006

(86) PCT No.: PCT/JP2006/300003
§ 371 (c)(1),
(2), (4) Date: Jul. 19, 2007

(87) PCT Pub. No.: WO2006/077745
PCT Pub. Date: Jul. 27, 2006

(65) Prior Publication Data

US 2008/0154592 A1 Jun. 26, 2008

(30) Foreign Application Priority Data

Jan. 20, 2005 (JP) ................................ 2005-012701

(51) Int. Cl.
*G10L 15/20* (2006.01)

(52) U.S. Cl. ...................................................... 704/233

(58) Field of Classification Search ................... 704/233
See application file for complete search history.

(56) References Cited

U.S. PATENT DOCUMENTS

| | | | |
|---|---|---|---|
| 6,339,758 | B1 | 1/2002 | Kanazawa et al. |
| 2003/0177007 | A1 | 9/2003 | Kanazawa et al. |
| 2004/0054528 | A1 | 3/2004 | Hoya et al. |
| 2004/0161121 | A1 | 8/2004 | Chol et al. |
| 2004/0220800 | A1 | 11/2004 | Kong et al. |

FOREIGN PATENT DOCUMENTS

| | | | |
|---|---|---|---|
| JP | 6-303689 | | 10/1994 |
| JP | 11-202894 | | 7/1999 |
| JP | 2000-047699 | A | 2/2000 |
| JP | 2002-099297 | A | 4/2002 |
| JP | 2003-271191 | A | 9/2003 |
| JP | 2003-323194 | A | 11/2003 |
| JP | 2004-229289 | A | 8/2004 |
| JP | 2004-289762 | A | 10/2004 |
| JP | 2004-334218 | A | 11/2004 |

*Primary Examiner* — Susan McFadden
(74) *Attorney, Agent, or Firm* — Foley & Lardner LLP

(57) ABSTRACT

System and device for receiving spatially mixed signals by a plurality of sensors and accurately removing a signal from a particular direction. The system includes a beamformer for removing a signal coming from a particular direction by steering a null to the particular direction, a coefficient calculation unit for calculating a coefficient for correcting the gain of the spectrum of the signal from a sensor according to the directivity characteristic of the beamformer, a gain correction unit for correcting the signal spectrum from the sensor by the calculated correction coefficient, and a spectrum correction unit for correcting the signal spectrum outputted from the beamformer by the corrected sensor signal spectrum. A plurality of sensor signals are received and a signal from a particular direction is removed by the beamformer. The signal which has failed to be removed by the beamformer is removed by the spectrum correction unit at a later stage.

30 Claims, 18 Drawing Sheets

SYSTEM, METHOD, DEVICE, AND PROGRAM FOR REMOVING ONE OR MORE SIGNALS INCOMING FROM ONE OR MORE DIRECTIONS

This application is the National Phase of PCT/JP2006/300003, filed Sep. 10, 2006, which claims priority to Japanese Application No. 2005-012701, filed Jan. 20, 2005, the disclosures of which are hereby incorporated by reference in their entirety.

TECHNICAL FIELD

The present invention relates to a signal removal method, signal removal system, and signal removal program, and particularly to a signal removal method, signal removal system, and signal removal program that remove a signal coming from a particular direction.

BACKGROUND ART

Conventionally, a signal removal apparatus of this kind is used for removing signals arriving to the microphone from particular directions in an environment where a plurality of audio/speech signals and noise are spatially mixed. As an example of a conventional signal removal apparatus, a noise suppression apparatus for speech (voice) recognition is described in Patent Document 1. This apparatus is a signal removal apparatus capable of removing a signal even when the signal comes from a direction different from a particular direction expected or the power of a signal coming from the particular direction is close to or less than the power of signals coming from other directions.

FIG. 18 is a block diagram showing the configuration of the noise suppression apparatus for speech recognition disclosed in Patent Document 1. This configuration will be described. The noise suppression apparatus for speech recognition comprises microphones M1 and M2, a frequency analysis unit 41 that extracts the frequency spectrum of a signal on each channel, a phase rotation unit 45 that rotates the phase of the channel 2, an adaptive beamformer 51 that cancels a target voice, a fixed beamformer 52 that cancels a target voice, and a target voice canceled outputs integration unit 54 that integrates outputs of the adaptive beamformer 51 and the fixed beamformer 52. As described, in the apparatus shown in FIG. 18, the outputs of the adaptive beamformer 51 and the fixed beamformer 52 are integrated by the target voice canceled outputs integration unit 54.

[Patent Document 1]

Japanese Patent Kokai Publication No. JP-P2003-271191A (FIG. 10)

DISCLOSURE OF THE INVENTION

Problems to be Solved by the Invention

The noise suppression apparatus for speech recognition described referring to FIG. 18 intends to cancel a signal (target voice) arriving at microphones from a particular direction, however, it has the following problems.

The first problem is that the apparatus cannot cancel a target voice with high accuracy when the actual direction from which a signal comes is different from the expected direction and the power of a signal coming from the particular direction is close to or less than the powers of signals coming from other directions. The reason is that this apparatus integrates the fixed beamformer 52 incapable of accurately canceling a target voice when an actual direction from which a signal comes is different from a direction expected as a particular direction and the adaptive beamformer 51 incapable of accurately canceling a target voice when the power of the signal coming from the particular direction is close to or less than the powers of signals coming from other directions.

The second problem is that the fixed beamformer cannot accurately cancel a target voice when there are gain differences between a plurality of microphones. The reason is that, since the fixed beamformer cancels a target voice by manipulating the phases and having waveforms of opposite phases overlap with each other, the waveforms cannot be canceled if the amplitudes of the waveforms are different even when the phases are completely inverted (when the particular direction expected and the actual direction from which the signal comes coincide).

Therefore, it is an object of the present invention to provide a signal removal method, signal removal system, and signal removal program that remove a signal coming from a particular direction with higher accuracy.

Means to Solve the Problems

The present invention for achieving the object is summarized as follows.

A method relating to an aspect of the present invention is a method in which a signal removal device removes a signal arriving at sensors from a particular direction using signals from a plurality of the sensors. This method comprises: removing a signal coming from a particular direction by a first beamformer that steers a null to the particular direction using signals from the plurality of sensors; calculating a coefficient for correcting the gain of the spectrum of a signal outputted from one of the plurality of sensors according to the directivity characteristic of the first beamformer; correcting the gain of the spectrum of the signal from the one sensor by the calculated correction coefficient; and correcting to reduce an output signal spectrum of the first beamformer by the corrected signal spectrum, wherein the step of the calculating a coefficient calculates the correction coefficient such that the gain at a direction within a predetermined range relating to the particular direction agrees to the first beamformer.

A method relating to another aspect of the present invention is a method in which a signal removal device removes a signal arriving at sensors from a particular direction using signals from a plurality of the sensors. This method comprises: removing a signal coming from a particular direction by a first beamformer that steers a null to the particular direction using signals from the plurality of sensors; deriving a signal spectrum from the sensor signals by a second beamformer that forms a second directivity characteristic different from a first directivity characteristic of the first beamformer of the plurality of sensors; calculating a coefficient for correcting the gain of the spectrum of a signal outputted from the second beamformer according to the first directivity characteristic and the second directivity characteristic; correcting the spectrum of the signal outputted from the second beamformer by the calculated correction coefficient; and correcting to reduce an output signal spectrum of the first beamformer by the corrected output signal spectrum of the second beamformer, wherein the step of the calculating a coefficient calculates the correction coefficient such that the gain at a direction within a predetermined range relating to the particular direction agrees to the first beamformer.

In a first development mode of the method relating to the present invention, when the spectrum of the signal outputted from the first beamformer is corrected, subtraction may be performed on a remaining signal or signals after the removal by the first beamformer.

In a second development mode of the method relating to the present invention, the gains of the plurality of sensors may be adjusted frequency by frequency.

In a third development mode of the method relating to the present invention, the steps other than the step in which the spectrum is corrected may be processed in a time domain.

In a fourth development mode of the method relating to the present invention, the gain of the signal with the corrected spectrum may be restored.

A signal removal device relating to an aspect of the present invention, which removes a signal arriving at sensors from a particular direction using signals from a plurality of the sensors. This device comprises: a first beamformer that removes a signal coming from a particular direction by steering a null to the particular direction, using signals from the plurality of sensors; a coefficient calculation unit that calculates a coefficient for correcting the gain of the spectrum of a signal outputted from one of the plurality of sensors according to the directivity characteristic of the first beamformer; a gain correction unit that corrects the spectrum of the signal from the one sensor by the calculated correction coefficient; and a spectrum correction unit that corrects to reduce an output signal spectrum of the first beamformer by the corrected sensor signal spectrum, wherein the coefficient calculation unit calculates the correction coefficient such that the gain at a direction within a predetermined range relating to the particular direction agrees to the first beamformer.

A signal removal device relating to another aspect of the present invention, which removes a signal arriving at sensors from a particular direction using signals from a plurality of the sensors. This device comprises: a first beamformer that removes a signal coming from a particular direction by steering a null to the particular direction using signals from the plurality of sensors; a second beamformer that forms a second directivity characteristic different from a first directivity characteristic of the first beamformer; a coefficient calculation unit that calculates a coefficient for correcting the gain of the spectrum of a signal outputted from the second beamformer according to the first directivity characteristic and the second directivity characteristic; a gain correction unit that corrects the spectrum of the signal outputted from the second beamformer by the calculated correction coefficient; and a spectrum correction unit that corrects to reduce an output signal spectrum of the first beamformer by the corrected output signal spectrum of the second beamformer, wherein the coefficient calculation unit calculates the correction coefficient such that the gain at a direction with a predetermined range relating to the particular direction agrees to the first beamformer.

In a first development mode of the signal removal device relating to the present invention, the spectrum correction unit may perform subtraction on a remaining signal or signals after the removal by the first beamformer.

A second development mode of the signal removal device relating to the present invention may further comprise a gain adjustment unit that adjusts the gains of the plurality of sensors frequency by frequency.

In a third development of the signal removal device relating to the present invention, the processings other than a processing of the spectrum correction unit may be performed in a time domain.

A fourth development of the signal removal device relating to the present invention may include a gain restoration unit that restores the gain of the signal with the corrected spectrum.

A program relating to an aspect of the present invention has a computer, constituting a device that removes a signal arriving at sensors from a particular direction using signals from a plurality of the sensors, perform the following processings. This program comprises: removing a signal coming from a particular direction by a first beamformer that steers a null to the particular direction using signals from the plurality of sensors; calculating a coefficient for correcting the gain of the spectrum of a signal outputted from one of the plurality of sensors according to the directivity characteristic of the first beamformer; correcting the gain of the spectrum of the signal from the sensor by the calculated correction coefficient; and correcting to reduce an output signal spectrum of the first beamformer by the corrected signal spectrum, wherein the processing of calculating a coefficient calculates the correction coefficient such that the gain at a direction within a predetermined range relating to the particular direction agrees to the first beamformer.

A program relating to another aspect of the present invention has a computer, constituting a device that removes a signal arriving at sensors from a particular direction using signals from a plurality of the sensors, perform the following processing. This program comprises: removing a signal coming from a particular direction by a first beamformer that steers a null to a particular direction using signals from the plurality of sensors; deriving a signal spectrum from the sensor signals of the plurality of sensors using a second beamformer that forms a second directivity characteristic different from a first directivity characteristic of the first beamformer; calculating a coefficient for correcting the gain of the spectrum of a signal outputted from the second beamformer according to the first directivity characteristic and the second directivity characteristic; correcting the spectrum of the signal outputted from the second beamformer by the calculated correction coefficient; and correcting to reduce an output signal spectrum of the first beamformer by the corrected output signal spectrum of the second beamformer, wherein the processing of calculating a coefficient calculates the correction coefficient such that the gain at a direction within a predetermined range relating to the particular direction agrees to the first beam former.

Meritorious Effects of the Invention

According to the present invention, a signal coming from a particular direction can be accurately removed by removing a remaining signal or signals (caused by a difference between a direction expected as a particular direction and an actual direction from which the signal comes) included in a signal after the processing of a beamformer, which steers a null to the particular direction, by spectrum correction even when there is a difference between a direction expected as the particular direction and an actual direction from which the signal comes, and when the power of a signal coming from the particular direction is close to or less than the power(s) of signal(s) coming from other direction(s). The reason is that, in the present invention, the spectrum of the remaining signal(s) after the processing of the beamformer is estimated using a correction coefficient calculated from the directivity characteristic of the beamformer and is removed by spectrum correction.

Further, according to the present invention, by adjusting a gain difference between the sensors before the processing of the beamformer that steers a null to a particular direction, the beamformer that steers the null to the particular direction can be made more accurate. The reason is that the present invention is configured so that the gain difference between the sensors is adjusted frequency by frequency before the processing of the beamformer.

EXPLANATIONS OF SYMBOLS

Figure 1:
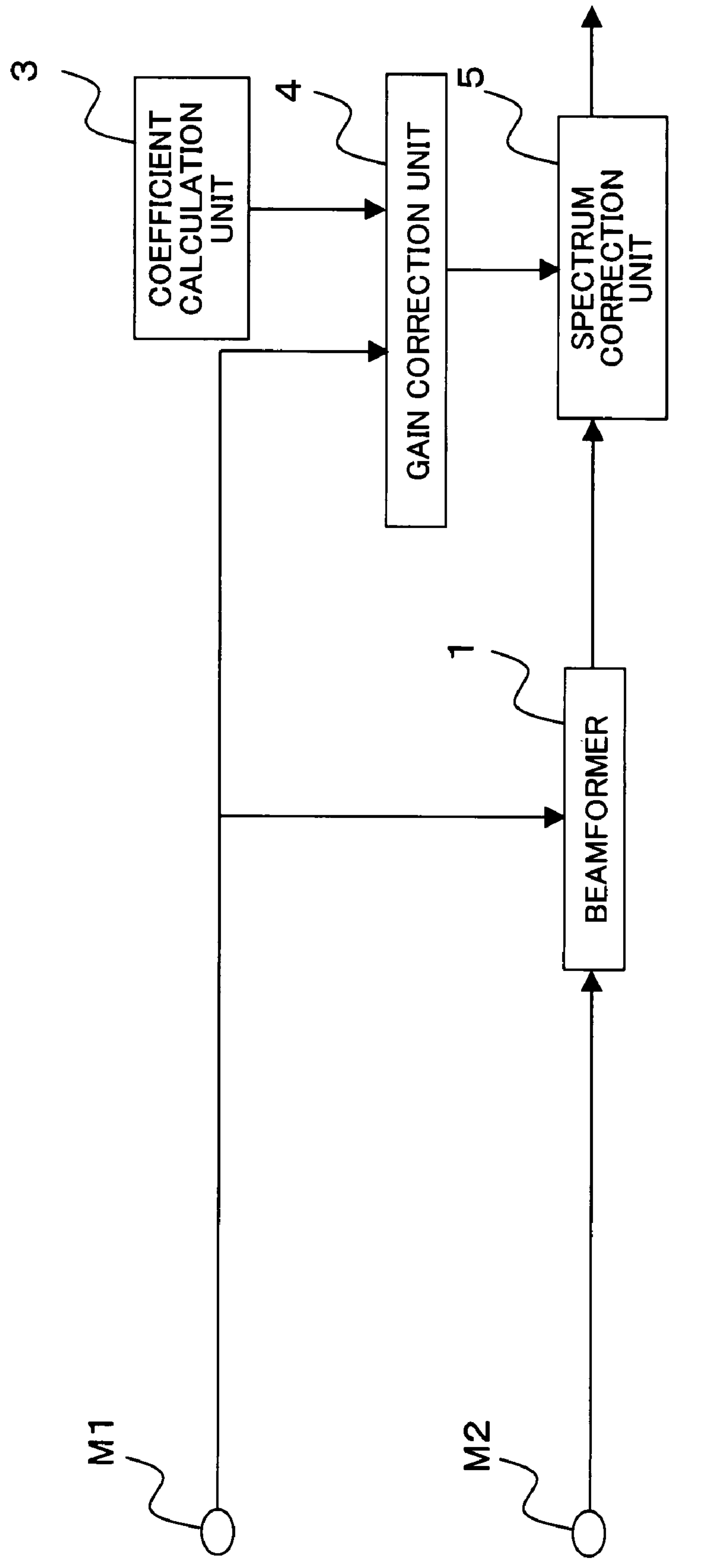
FIG. 1 is a block diagram showing the configuration of a signal removal system relating to a first example of the present invention.

1, 2: beamformer
3: coefficient calculation unit
4: gain correction unit
5: spectrum correction unit
6: coefficient calculation unit
7: gain adjustment unit
8, 10, 10*a*, 10*b*: signal removal unit
9: gain restoration unit
11: signal detection unit
12: signal separation unit
13: signal enhancement unit
14: speech enhancement unit
20: memory device
21: input device
22: signal removal system
23: output device
24: program for signal removal
25: signal detection system
27: program for signal detection
28: signal separation system
30: program for signal separation
31: signal enhancement system
33: program for signal enhancement
34: speech enhancement system
36: program for speech enhancement

PREFERRED MODES FOR CARRYING OUT THE INVENTION

First Example

Examples of the present invention will be described in detail with reference to the attached drawings. FIG. 1 is a block diagram showing the configuration of a signal removal system relating to a first example of the present invention. In FIG. 1, the signal removal system includes sensors M1 and M2; a beamformer 1 that receives sensor signals from the sensors M1 and M2 and removes a signal(s) arriving at the sensors from a particular direction; a coefficient calculation unit 3 that calculates a coefficient for correcting the gain(s) of the spectra of the sensor signal(s) according to the directivity characteristic of the beamformer 1; a gain correction unit 4 that corrects the spectra of the sensor signal(s) by the correction coefficient calculated by the coefficient calculation unit 3; and a spectrum correction unit 5 that corrects the signal spectrum outputted from the beamformer 1 by the corrected sensor signal spectrum. In FIG. 1, only two sensors are shown, however, three or more sensors may be used.

Figure 10:
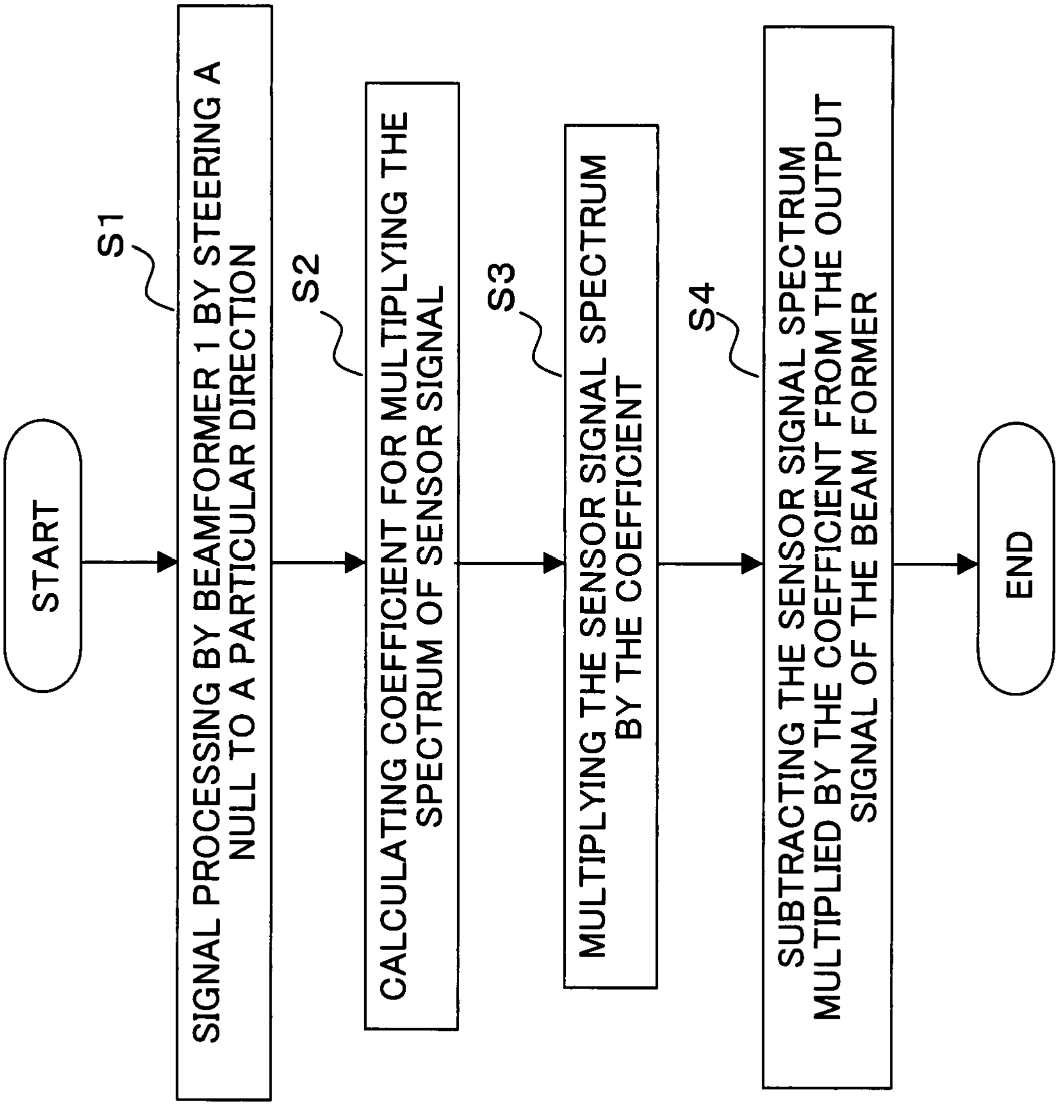
FIG. 10 is a flowchart showing the processing procedure in the signal removal system relating to the first example of the present invention.

FIG. 10 is a flowchart showing the processing procedure in the signal removal system relating to the first example of the present invention. Referring to FIGS. 1 and 10, the signal removal system of the present example will be described in detail.

Xq(f,t) is a plurality of sensor signals received by the beamformer 1. Note that q represents the channel number (there are only two channels in FIG. 1 in order to simplify the explanation, therefore q=1, 2); f represents the frequency number (f=0, 1, . . . , N/2 where N represents the number of Discrete Fourier Transform points); and t represents the frame number (t=0, 1, . . . ).

Xq(f,t) is a plurality of sensor signals, which are a mixture of a plurality of signals Sk(f,t) (K number of signals) arriving at the sensors from various directions, and is modeled using the following formulae (1) and (2):

$$X1(f,t)=\Sigma\_\{k=1\sim K\}\exp\{j2\pi f(fs/N)(d\sin\theta k(t)/c)\}Sk(f,t) \quad \text{Formula (1)}$$

$$X2(f,t)=\Sigma\_\{k=1\sim K\}\exp\{j2\pi f(fs/N)(-d\sin\theta k(t)/c)\}Sk(f,t) \quad \text{Formula (2)}$$

Note that Σ_{k=1~K} represents the summation of k=1~K. Further, fs represents the sampling frequency; d represents ½ of the distance between the sensors; θk(t) represents the direction in which the signal Sk(f,t) comes; and c represents the propagation speed of the signal.

The beamformer 1 removes a signal (or signals) coming from a particular (specific) direction θ(t) by steering a null to the direction θ(t) (step S1 in FIG. 10). An output signal Y(f,t) of the beamformer 1 is given by the following formula (3):

$$Y(f,t)=W1(f,t)X1(f,t)+W2(f,t)X2(f,t) \quad \text{Formula (3)}$$

Y(f,t) represents the output signal of the beamformer 1. Wq(f, t) represents the filter coefficient of the beamformer 1 and can be given, for instance, by the following formulae (4) and (5):

$$W1(f,t)=0.5\ \exp\{-j2\pi f(fs/N)(d\sin\theta(t)/c)\} \quad \text{Formula (4)}$$

$$W2(f,t)=-0.5\ \exp\{-j2\pi f(fs/N)(-d\sin\theta(t)/c)\} \quad \text{Formula (5)}$$

Here, by substituting the formulae (1), (2), (4), and (5) into the formula (3) and rearranging it, a formula (6) is given:

$$Y(f,t)=j\Sigma\_\{k=1\sim K\}\sin\{2\pi f(fs/N)(d/c)(\sin\theta k(t)-\sin\theta(t))\}Sk(f,t) \quad \text{Formula (6)}$$

Further, assuming that the signals Sk(f,t) for various k are uncorrelated to each other, the output signal spectrum |Y(f,t)| of the beamformer 1 is given by the following formula (7):

$$|Y(f,t)|=sqrt(\Sigma\_\{k=1\sim K\}\sin\hat{}2\{2\pi f(fs/N)(d/c)(\sin\theta k(t)-\sin\theta(t))\}|Sk(f,t)|\hat{}2) \quad \text{Formula (7)}$$

Here, sqrt(x) represents the square-root operation of x and x^2 represents the square operation of x. In the formula (7), the content of the sqrt parentheses is the summation of value obtained by multiplying |Sk(f,t)|^2 by a weight sin^2{2πf(fs/N)(d/c)(sin θk(t)−sin θ(t))} for k{k=1~K}.

Figure 11:
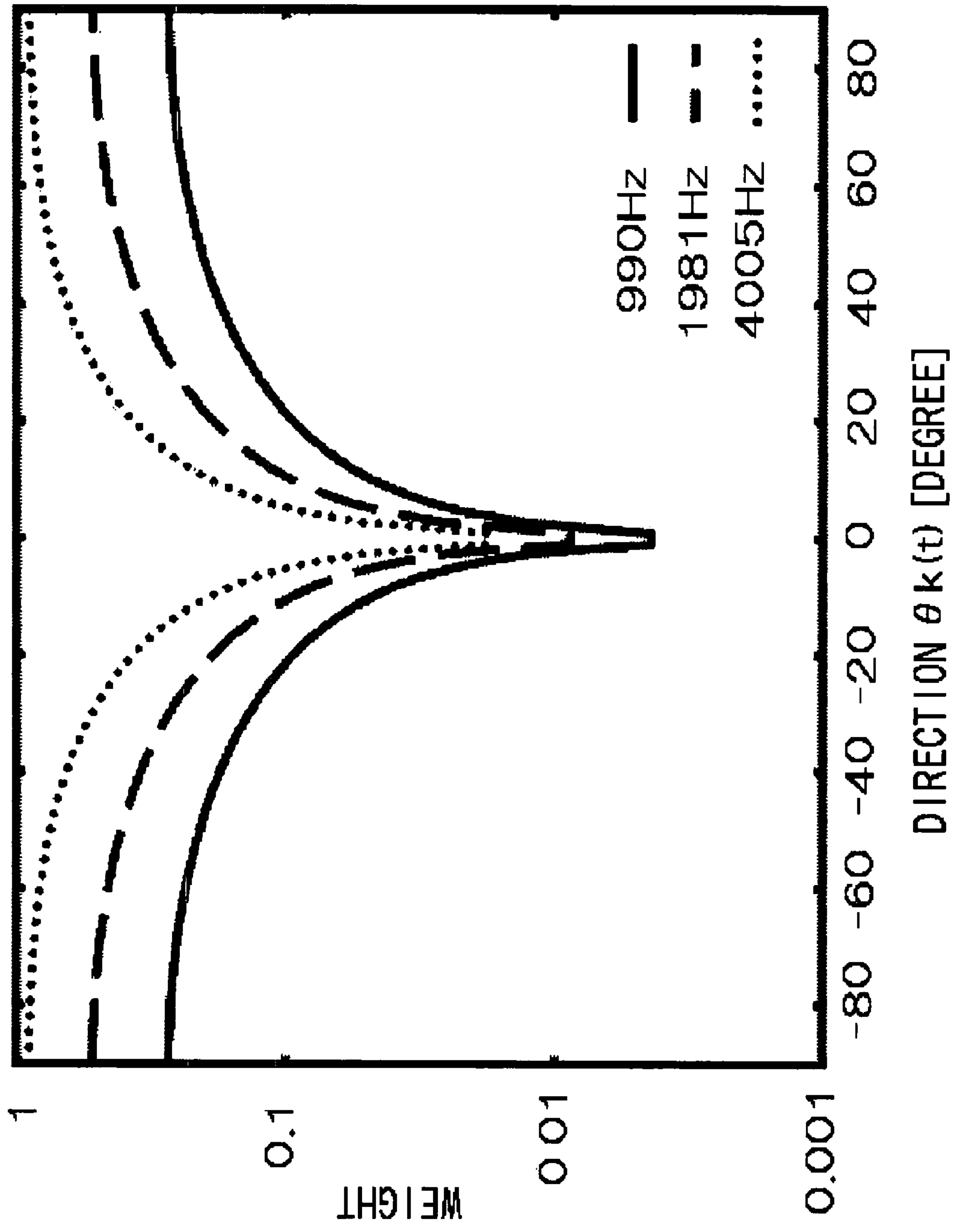
FIG. 11 is a diagram showing an example of the directivity characteristic of a beamformer 1.

For instance, as shown in FIG. 11, the square root of the weight, i.e., the directivity characteristic of the beamformer 1, when θ(t)=0[degree]; fs=11025[Hz]; N=256; d=0.015 [m]; and c=340 [m/s] can be given by a formula (8):

$$D1(f,\theta k(t),\theta(t))=sqrt(\sin\hat{}2\{2\pi f(fs/N)(d/c)(\sin\theta k(t)-\sin\theta(t))\}) \quad \text{Formula (8)}$$

As indicated in FIG. 11, a null (dead angle) (at which the weight is 0) is formed in a direction of θk(t)=0[degree]. Therefore, a signal (or signals) arriving at the sensors from the direction of 0 degree is removed by the beamformer 1. The further a signal deviates away from the 0-degree direction, the more the weight increases and the less likely that the signal will be removed.

In order to accurately remove a signal (or signals) even when an actual direction ((θk((t)) from which the signal comes is different from the direction (θ(t)=0[degree] in this example) the beamformer 1 expects unwanted signals to come from, a spectrum correction processing, described below, is performed.

The coefficient calculation unit 3 determines how much shift from the direction expected by the beamformer 1 (θ(t)= 0[degree] in this example) is permitted, and calculates the coefficient α(f,t) for correcting the gains of the spectra of the sensor signals according to the directivity characteristic 1 of the formula (8) (step S2 in FIG. 10). For instance, when a shift of 10 degrees is permitted, a formula (9) is given:

$$\alpha(f,t)=D1(f,\theta(t)+10,\theta(t)) \quad \text{Formula (9)}$$

The gain correction unit 4 corrects the spectrum |Xq(f,t)| (q=1 or 2) of the sensor signal according to the correction coefficient α(f,t) calculated by the coefficient calculation unit 3 (step S3 in FIG. 10). Since the spectrum |Xq(f,t)| of the sensor signal has a weight of 1 for all the directions θk(t), formulae (10) and (11) are given:

$$\alpha(f,t)|Xq(f,t)|>=|Y(f,t)| \text{ (in the case where } 0-10<=\theta k(t)<=0+10) \quad \text{Formula (10)}$$

$$\alpha(f,t)|Xq(f,t)|<|Y(f,t)| \text{ (in all other cases)} \quad \text{Formula (11)}$$

The spectrum correction unit 5 corrects the output signal spectrum of the beamformer 1 according to the output signal spectrum α(f,t)|Xq(f,t)| of the gain correction unit 4 as shown in a formula (12) (step S4 in FIG. 10):

$$|Z(f,t)|=\max[|Y(f,t)|-\alpha(f,t)|Xq(f,t)|,\ \text{floor}] \quad \text{Formula (12)}$$

Note that "floor" represents a flooring value for preventing the spectrum value from being negative and may be freely set within a range of 0 to |Y(f,t)|.

By the formulae (10) to (12), signals coming from the directions θ(t)=0±10 are removed.

Next, the function and effect of the first example of the present invention will be described. In the present example, even when an actual direction from which a signal comes is different from an direction expected by the beamformer 1, the signal coming from a particular direction can be accurately removed by correcting the spectrum of the sensor signal by the correction coefficient calculated according to the directivity characteristic of the beamformer 1 and correcting the output signal spectrum of the beamformer 1 by the corrected sensor signal spectrum at a stage downstream of the beamformer 1.

Second Example

Figure 2:
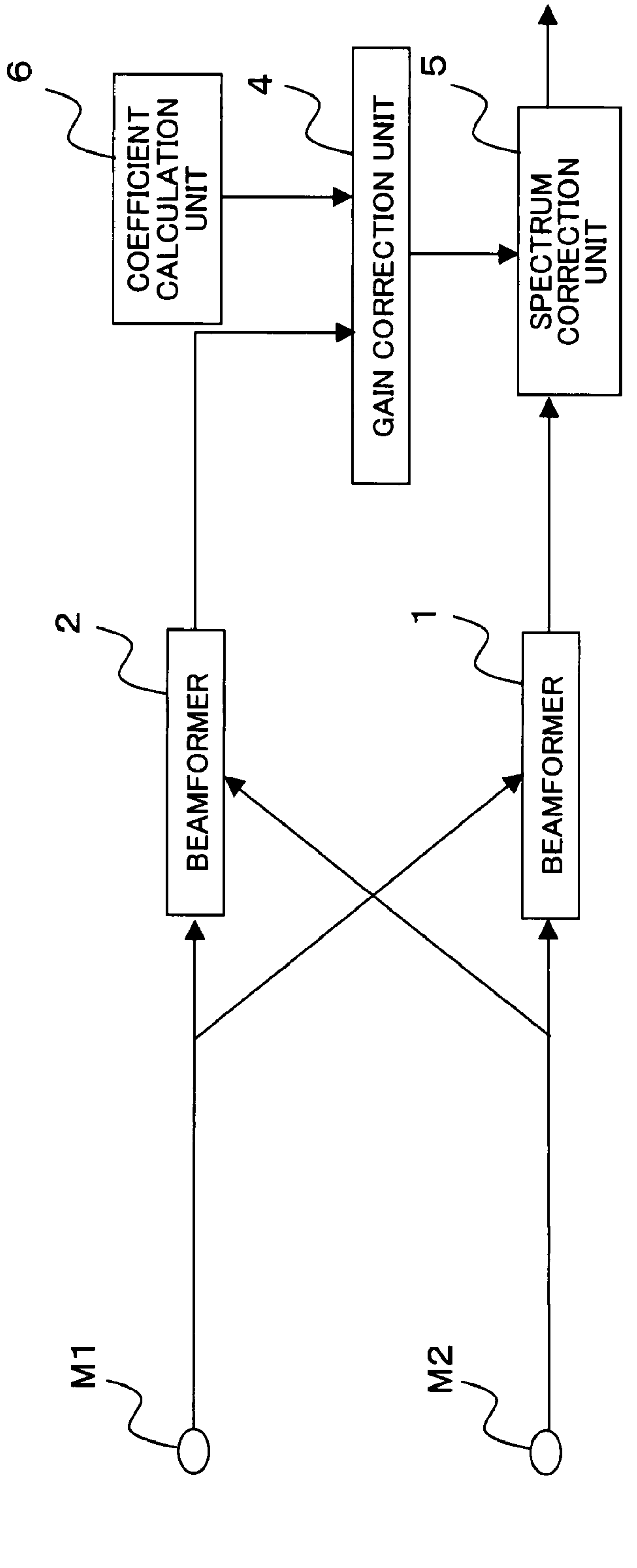
FIG. 2 is a block diagram showing the configuration of a signal removal system relating to a second example of the present invention.

FIG. 2 is a block diagram showing the configuration of a signal removal system relating to a second example of the present invention. Comparing the signal removal system in FIG. 2 with the signal removal system in FIG. 1, only differences reside in that a beamformer 2 is added and a coefficient calculation unit 6 replaces the coefficient calculation unit 3 of FIG. 1 in FIG. 2. Referring to FIG. 2, the signal removal system relating to the second example will be described in detail.

Referring to FIG. 2, the signal removal system includes sensors M1 and M2; a beamformer 1 that receives sensor signals from the sensors M1 and M2 and removes a signal arriving at the sensors from a particular direction; the beamformer 2 having a directivity characteristic (directivity characteristic 2) different from a directivity characteristic of the beamformer 1 (directivity characteristic 1); the coefficient calculation unit 6 that calculates a coefficient for correcting the gain of the signal spectrum outputted from the beamformer 2 according to the directivity characteristic 1 and the directivity characteristic 2; a gain correction unit 4 that corrects the signal spectrum outputted from the beamformer 2 by a correction coefficient calculated by the coefficient calculation unit 6; and a spectrum correction unit 5 that corrects the signal spectrum outputted from the beamformer 1 by the corrected signal spectrum outputted from the beamformer 2. In FIG. 2, only two sensors are shown, however, three or more sensors may be used.

The beamformer 1 processes a plurality of sensor signals as described in the first example. The beamformer 2 processes a plurality of sensor signals so that it forms a different directivity characteristic from the beamformer 1, and its output signal is expressed by a formula (13):

$$X'(f,t)=W'1(f,t)X1(f,t)+W'2(f,t)X2(f,t) \quad \text{Formula (13)}$$

X'(f,t) represents the output signal of the beamformer 2. W'q (f,t) represents the filter coefficient of the beamformer 2 and can be expressed by the following formulae (14) and (15):

$$W'1(f,t)=0.5\exp\{-j2\pi f(fs/N)(d\sin\theta(t)/c)\}$$ Formula (14)

$$W'2(f,t)=0.5\exp\{-j2\pi f(fs/N)(-d\sin\theta(t)/c)\}$$ Formula (15)

Here, by substituting the formulae (1), (2), (14), and (15) into the formula (13) and rearranging it, a formula (16) is given:

$$X'(f,t)=\Sigma\_\{k=1\sim K\}\cos\{2\pi f(fs/N)(d/c)(\sin\theta k(t)-\sin\theta(t))\}Sk(f,t)$$ Formula (16)

Further, assuming that the signals Sk(f,t) for various k are uncorrelated to each other, the output signal spectrum |X'(f,t)| of the beamformer 2 is given by a formula (17):

$$|X'(f,t)|=sqrt(\Sigma\_\{k=1\sim K\}\cos\hat{}2\{2\pi f(fs/N)(d/c)(\sin\theta k(t)-\sin\theta(t))\}|Sk(f,t)|\hat{}2)$$ Formula (17)

In the formula (17), the content of the sqrt parentheses is the summation of values obtained by multiplying |Sk(f,t)|^2 by a weight cos^2{2πf(fs/N)(d/c)(sin θk(t)−sin θ(t))} for k{k=1~K}. Therefore, the directivity characteristic of the beamformer 2 (the directivity characteristic 2 shown in FIG. 12) is as expressed by a formula (18):

$$D2(f,\theta k(t),\theta(t))=sqrt(\cos\hat{}2\{2\pi f(fs/N)(d/c)(\sin\theta k(t)-\sin\theta(t))\})$$ Formula (18)

The formula (18) above is different from the directivity characteristic D1(*f*,θk(t),θ(t)) (the directivity characteristic 1 shown in FIG. 11) of the beamformer 1 indicated in the formula (8).

The coefficient calculation unit 6 determines how much shift from the direction expected by the beamformer 1 (θ(t)=0[degree] in this example) is permitted, and calculates the coefficient α(f,t) for correcting the gains of the spectra of the sensor signals according to the directivity characteristic 1 and the directivity characteristic 2. For instance, when a shift of 10 degrees is permitted, a formula (19) is given:

$$\alpha(f,t)=D1(f,\theta(t)+10,\theta(t))/D2(f,\theta(t)+10,\theta(t))$$ Formula (19)

Figure 12:
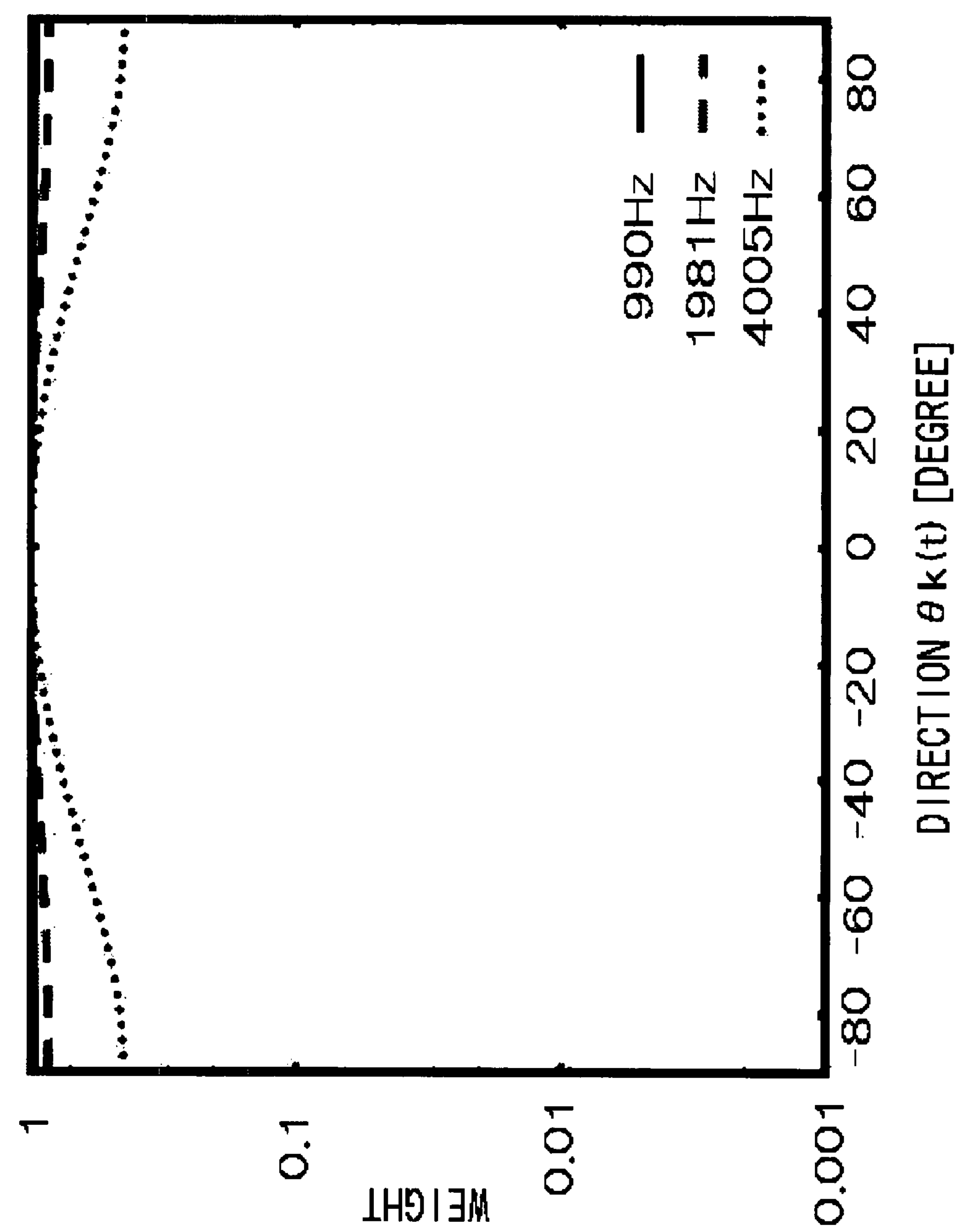
FIG. 12 is a diagram showing an example of the directivity characteristic of a beamformer 2.

The gain correction unit 4 corrects the output signal spectrum |X'(f,t)| of the beamformer 2 according to the correction coefficient α(f,t) calculated by the coefficient calculation unit 6. The directivity characteristic of the output signal spectrum |X'(f,t)| of the beamformer 2 is as shown in FIG. 12 and expressed by formulae (20) and (21):

$$\alpha(f,t)|X'(f,t)|>=|Y(f,t)| \text{ (in the case where } 0-10<=\theta k(t)<=0+10)$$ Formula (20)

$$\alpha(f,t)|X'(f,t)|<|Y(f,t)| \text{ (in all other cases)}$$ Formula (21)

The spectrum correction unit 5 corrects the output signal spectrum of the beamformer 1 according to the output signal spectrum α(f,t)|X'(f,t)| of the gain correction unit 4 as shown in a formula (22):

$$|Z(f,t)|=\max[|Y(f,t)|-\alpha(f,t)|X'(f,t)|,\ \text{floor}]$$ Formula (22)

Next, the function and effect of the second example of the present invention will be described. In the present example, even when an actual direction from which a signal comes is different from a direction expected by the beamformer 1, the signal(s) coming from a particular direction can be accurately removed by correcting the output signal spectrum of the beamformer 2 by the correction coefficient(s) calculated according to the directivity characteristics of the beamformer 1 and the beamformer 2, and correcting the output signal spectrum of the beamformer 1 by the corrected output signal spectrum of the beamformer 2 at a stage downstream of the beamformer 1.

Further, while removing a signal coming from a particular direction, it is possible to reduce the influence of the spectrum correction processing on signals coming from other directions by selecting the filter coefficients of the beamformer 2 as indicated by the formulae (14) and (15). In other words, by varying the coefficient of the beamformer 2, it becomes possible to vary the directivity characteristic of the entire signal removal system more freely.

Third Example

Figure 3:
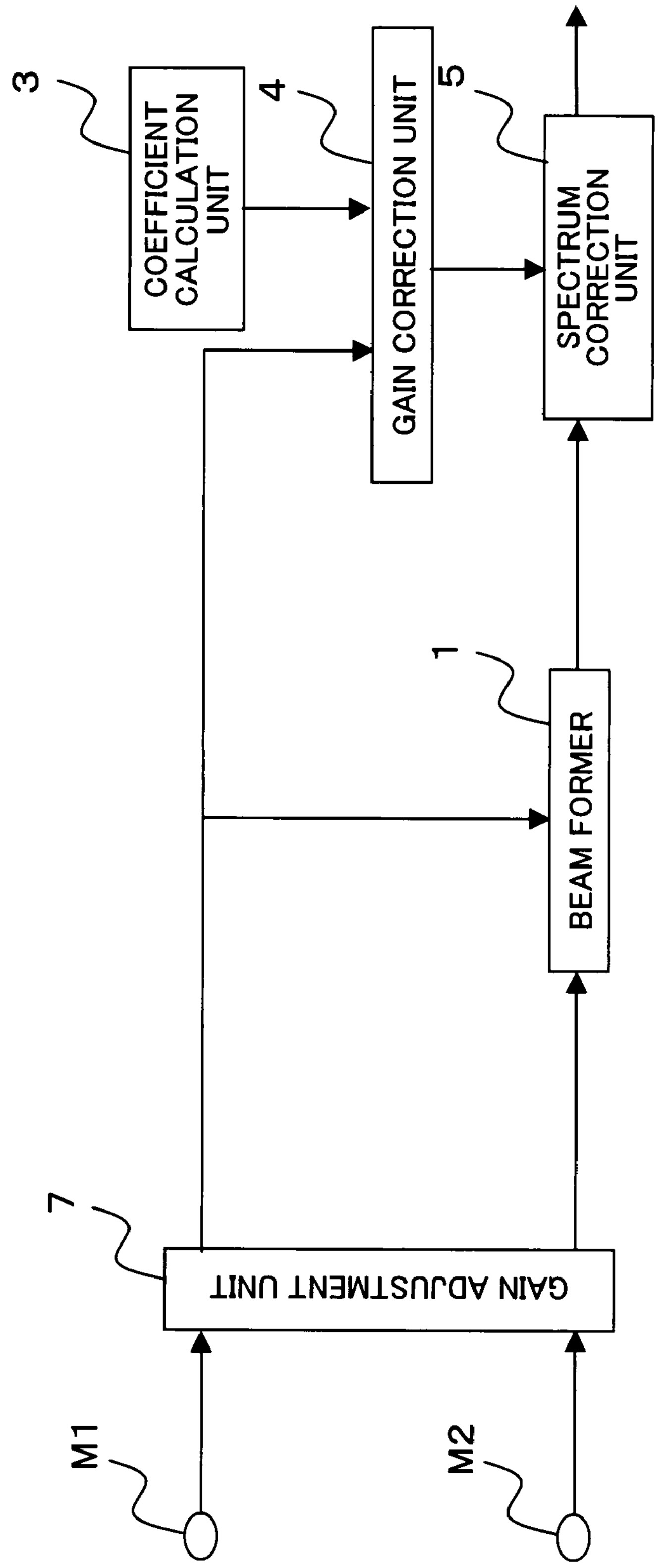
FIG. 3 is a block diagram showing the configuration of a signal removal system relating to a third example of the present invention.

FIG. 3 is a block diagram showing the configuration of a signal removal system relating to a third example of the present invention. Comparing the signal removal system in FIG. 3 with the signal removal system in FIG. 1, the only difference is that a gain adjustment unit 7 that receives a plurality of sensor signals and adjusts the gains is added. Since the operations of all the units other than the gain adjustment unit 7 are the same as the first example, only the operation of the gain adjustment unit 7 will be described. In FIG. 3, only two sensors are shown, however, three or more sensors may be used.

When there is a gain difference between the plurality of the sensor signals indicated by the formulae (1) and (2), the gain adjustment unit 7 adjusts the gain difference. For instance, the plurality of the sensor signals are modeled using formulae (23) and (24):

$$X1(f,t)=\Sigma\_\{k=1\sim K\}\exp\{j2\pi f(fs/N)(d\sin\theta k(t)/c)\}Sk(f,t)$$ Formula (23)

$$X2(f,t)=b(f)\Sigma\_\{k=1\sim K\}\exp\{j2\pi f(fs/N)(-d\sin\theta k(t)/c)\}Sk(f,t)$$ Formula (24)

Note that b(f) represents the gain relating to the sensor signal X2(*f,t*).

Gain differences such as the one indicated by the formulae (23) and (24) are caused by actual individual differences among sensors. In order to adjust these differences, the gain adjustment unit 7 adjusts the gain frequency by frequency as indicated by a formula (25):

$$X2(f,t)=sqrt(<|X1(f,t)|\hat{}2>\_t/<|X2(f,t)|\hat{}2>\_t)X2(f,t)$$ Formula (25)

Note that < >_t represents a temporal mean operation (it may be any type of mean operation such as moving average, mean operation using low-pass filters or order-statistics filters).

By the processing of the formula (25), b(f) in the formula (24) can be considered to be the equivalent of 1 even when there is a gain difference between the sensors, therefore the formula (24) coincides with the formula (2). As a result, the beamformer 1 becomes more accurate.

In the present example, by adjusting the gains of the plurality of sensor signals before being processed by the beamformer 1 when there is a gain difference between the sensors, the beamformer 1 can be made more accurate, enabling the entire signal removal system to accurately remove a signal coming from a particular direction.

Fourth Example

Figure 4:
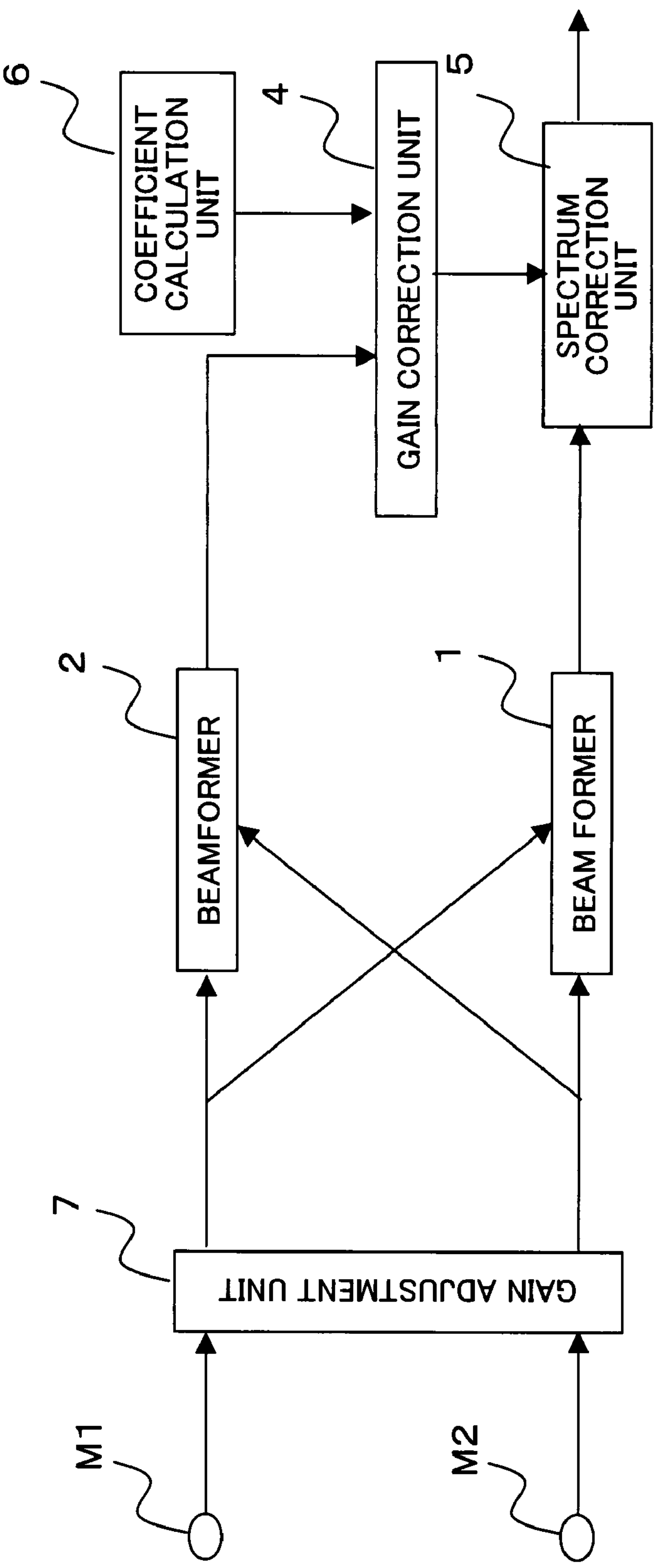
FIG. 4 is a block diagram showing the configuration of a signal removal system relating to a fourth example of the present invention.

FIG. 4 is a block diagram showing the configuration of a signal removal system relating to a fourth example of the present invention. Comparing the signal removal system in FIG. 4 with the signal removal system in FIG. 2, the only difference resides in that a gain adjustment unit 7 that receives a plurality of sensor signals and adjusts the gains is added.

The operation of the gain adjustment unit 7 is the same as the third example shown in FIG. 3. Further, the operations of the units other than the gain adjustment unit 7 are the same as the second example shown in FIG. 2. In FIG. 4, only two sensors are shown, however, three or more sensors may be used.

In the present example, by adjusting the gains of the plurality of sensor signals before being processed by the beamformer 1 and the beamformer 2 when there is a gain difference between the sensors, the beamformer 1 and the beamformer 2 can be made more accurate, enabling the entire signal removal system to accurately remove a signal coming from a particular direction. Further, compared with the third example, the directivity characteristic of the entire signal removal system can be more freely varied by using the beamformer 2.

In the first to fourth examples described above, since all the processings are linear operations, other than the processing by the spectrum correction unit 5, which is a nonlinear operation in a frequency domain, the processings can be performed also in time domains by processing the multiplications in frequency domains by convolution in time domains.

Further, in the first to fourth examples, the sensor signals are modeled using the formulae (1) and (2) or (23) and (24), and the filter coefficients of the beamformer 1 that forms a null in a particular direction are expressed by the formulae (4) and (5). However, if the models of the sensor signals are different from the formulae (1) and (2), the filter coefficients of the beamformer will be different as well. Therefore, when the models of the sensor signals are different, it is possible to use different filter coefficients from the ones expressed by the formulae (4) and (5). This also applies to the beamformer 2.

Further, if the coefficients of the beamformer 1 and the beamformer 2 change, their respective directivity characteristic indicated by the formulae (8) and (18) will change as well.

Further, in the first to fourth examples, we assumed the particular direction as $\theta(t)=0$ degree, however, it may be any other direction. Further, it is possible to vary $\theta(t)$ over time.

Further, in the first to fourth examples, the coefficient calculation unit 3 and the coefficient calculation unit 6 permit a shift of 10 degrees from the particular direction, however, the shift may be any degrees. Further, it is possible to vary the permitted range over time. When the permitted range of shift and the particular direction do not vary over time, it is possible to reduce the calculation amount by performing the calculation once and tabling the results since the coefficient values do not change, either.

Fifth Example

Figure 5:
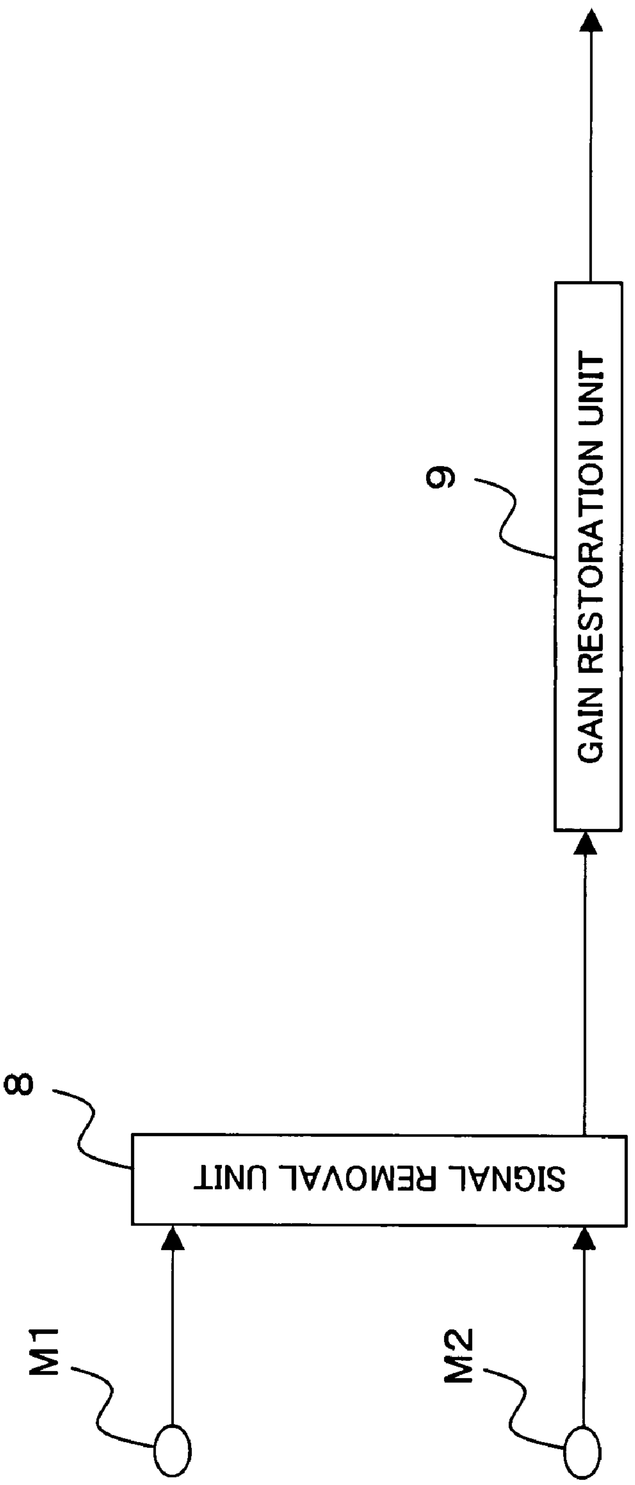
FIG. 5 is a block diagram showing the configuration of a signal removal system relating to a fifth example of the present invention.

FIG. 5 is a block diagram showing the configuration of a signal removal system relating to a fifth example of the present invention. The signal removal system shown in FIG. 5 includes sensors M1 and M2, a signal removal unit 8, and a gain restoration unit 9. The signal removal unit 8 is constituted by any one of the signal removal systems described in the first to fourth examples of the present invention. A signal-removed signal outputted from the signal removal unit 8 is received by the gain restoration unit 9, which restores the gain of the signal. In FIG. 5, only two sensors are shown, however, three or more sensors may be used.

The gain restoration unit 9 restores the gain of the signal removed in the signal removal unit 8. The restoration is performed according to the directivity characteristic formed by the signal removal unit 8. The directivity characteristic formed by the signal removal unit 8 can be expressed by a formula (26):

$$D(f,\theta k(t),\theta(t))=D1(f,\theta k(t),\theta(t))-\alpha(f,t)D2(f,\theta k(t),\theta(t)) \quad \text{Formula (26)}$$

Note that, when the signal removal unit 8 is the signal removal system of the first or third example of the present invention, $D2(f, \theta k(t),\theta(t))$ in the formula (26) is 1.

By using the formula (26), what direction a signal whose gain is being restored to 1 is coming from is determined, and a restoration coefficient value $\beta(f,t)$ of the gain is calculated using a formula (27). For instance, when the gain of a signal coming from a direction of 15 degrees is intended to be restored to 1, the formula (27) is as follows:

$$\beta(f,t)=1.0/D(f,15,\theta(t)) \quad \text{Formula (27)}$$

Then the gain of the output signal spectrum $|Z(f,t)|$ of the signal removal unit 8 is restored by $\beta(f,t)$. Further, the gain restoration unit 9 outputs $|Z'(f,t)|$ as indicated by a formula (28):

$$|Z'(f,t)|=\min[\beta(f,t)|Z(f,t)|,\text{ceil}] \quad \text{Formula (28)}$$

Note that ceil represents the ceiling of $|Z'(f,t)|$ and can be set to any value such as $|Xq(f,t)|$ and $|X'q(f,t)|$.

In the formula (27), it is set so that the gain of a signal coming from the direction of 15 degrees is restored to 1, however, it may be set to any other direction other than the direction of 15 degrees.

In the present example, distortion (caused by the gain difference frequency by frequency) added in the signal removal unit 8 can be reduced by having the gain restoration unit 9 restore the gain of the output signal of the signal removal unit 8.

Sixth Example

Figure 6:
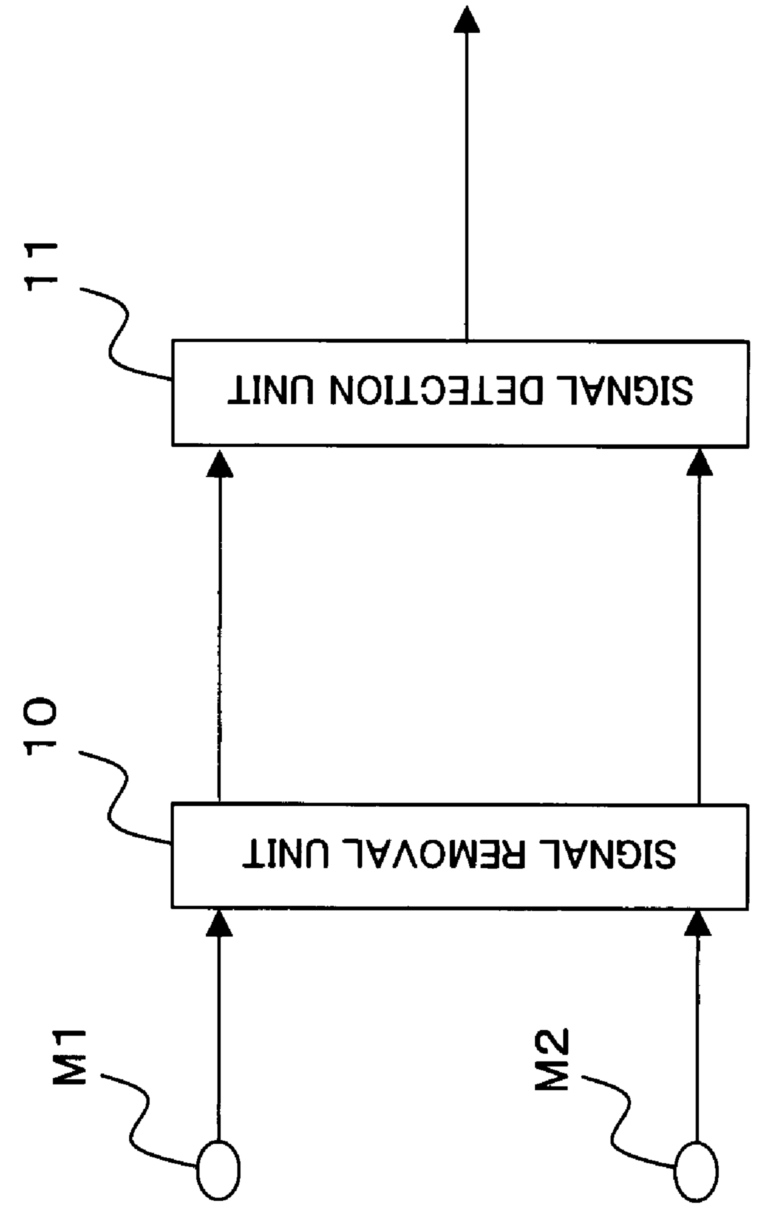
FIG. 6 is a block diagram showing the configuration of a signal detection system relating to a sixth example of the present invention.

FIG. 6 is a block diagram showing the configuration of a signal detection system relating to a sixth example of the present invention. In FIG. 6, the signal detection system includes sensors M1 and M2, a signal removal unit 10, and a signal detection unit 11. The signal removal unit 10 is constituted by any one of the signal removal systems described in the first to fifth examples of the present invention. At least one of a signal-removed signal (or a signal-removed signal after the gain restored) outputted from the signal removal unit 10, sensor signals, sensor signals with their gains adjusted, or the output signal of the beamformer 2 is received by the signal detection unit 11. Using these signals, the signal detection unit 11 detects a signal from the direction from which the signal removed by the signal removal unit 10 came. The signal detection unit 11 can detect signals using various information such as a power difference between a plurality of signals received, correlation value, and distortion value (such as a logarithmic spectrum distance between a plurality of signals). In FIG. 6, only two sensors are shown, however, three or more sensors may be used.

In the present example, whether or not there is a signal coming from a particular direction can be accurately detected by providing the signal detection unit 11 at a stage downstream of the signal removal unit 10. In other words, even when signals with different powers come from various directions, a signal coming from the particular direction can be detected. This is because the signal removal unit 10 accurately removes a signal coming from the particular direction.

Seventh Example

Figure 7:
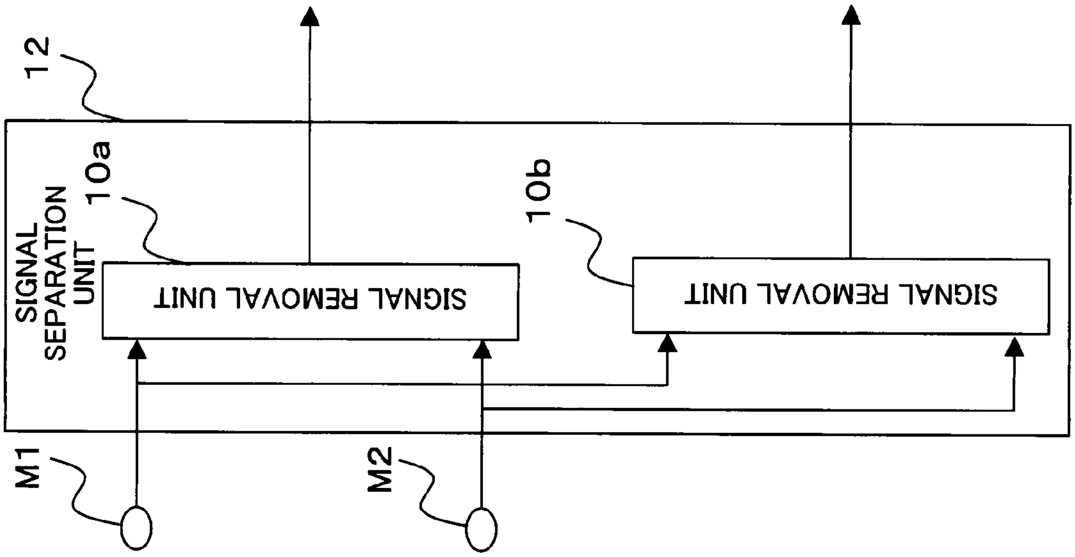
FIG. 7 is a block diagram showing the configuration of a signal separation system relating to a seventh example of the present invention.

FIG. 7 is a block diagram showing the configuration of a signal separation system relating to a seventh example of the present invention. In FIG. 7, the signal separation system includes sensors M1 and M2, a plurality of signal removal units 10*a* and 10*b*, and a signal separation unit 12. The signal removal units 10*a* and 10*b* are constituted by any one of the signal removal systems described in the first to fifth examples of the present invention. Note that a direction from which signals removed by the signal removal unit 10*a* comes is different from a direction from which signals removed by the signal removal unit 10*b* comes. For instance, let's assume that signals come from the directions of 0 degree and 50 degrees and the signal removal unit 10*a* removes signals coming from the 0-degree direction while signals coming from the 50-degree direction are removed by the signal removal unit 10*b*. As an output of the signal separation unit 12, the signal removal unit 10*a* outputs signals coming from the 50-degree direction and the signal removal unit 10*b* outputs signals coming from the 0-degree direction, therefore signals are separated by direction. In FIG. 7, only two sensors and two signal removal units are shown, however, three or more sensors or signal removal units may be used.

According to the present example, it is possible to separate signals coming from a plurality of particular directions by using the signal separation unit 12 constituted by a plurality of signal removal units.

Eighth Example

Figure 8:
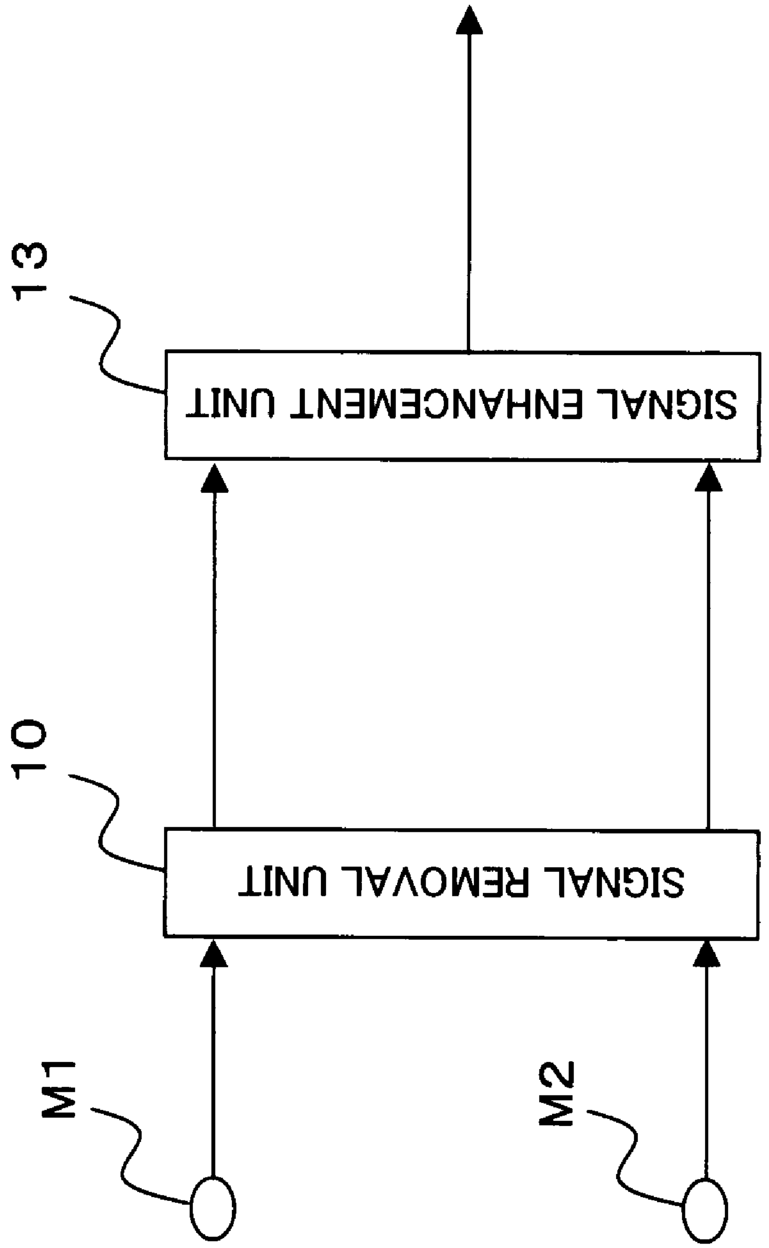
FIG. 8 is a block diagram showing the configuration of a signal enhancement system relating to an eighth example of the present invention.

FIG. 8 is a block diagram showing the configuration of a signal enhancement system relating to an eighth example of the present invention. In FIG. 8, the signal enhancement system includes sensors M1 and M2, a signal removal unit 10, and a signal enhancement unit 13. The signal removal unit 10 is constituted by any one of the signal removal systems described in the first to fifth examples of the present invention. At least one of a signal-removed signal (or a signal-removed signal after the gain restored) outputted from the signal removal unit 10, sensor signals, sensor signals with their gains adjusted, or the output signal of the beamformer 2 is received by the signal enhancement unit 13. Using these signals, the signal enhancement unit 13 enhances a signal from the direction from which the signal removed by the signal removal unit 10 came.

In the present example, a signal coming from a particular direction can be accurately enhanced by providing the signal enhancement unit 13 at a stage following the signal removal unit 10. In other words, even when signals with different powers come from various directions, a signal coming from the particular direction can be enhanced. The reason is that the signal removal unit 10 accurately removes a signal coming from the particular direction, and as a result, signals coming from other directions can be inferred.

Ninth Example

Figure 9:
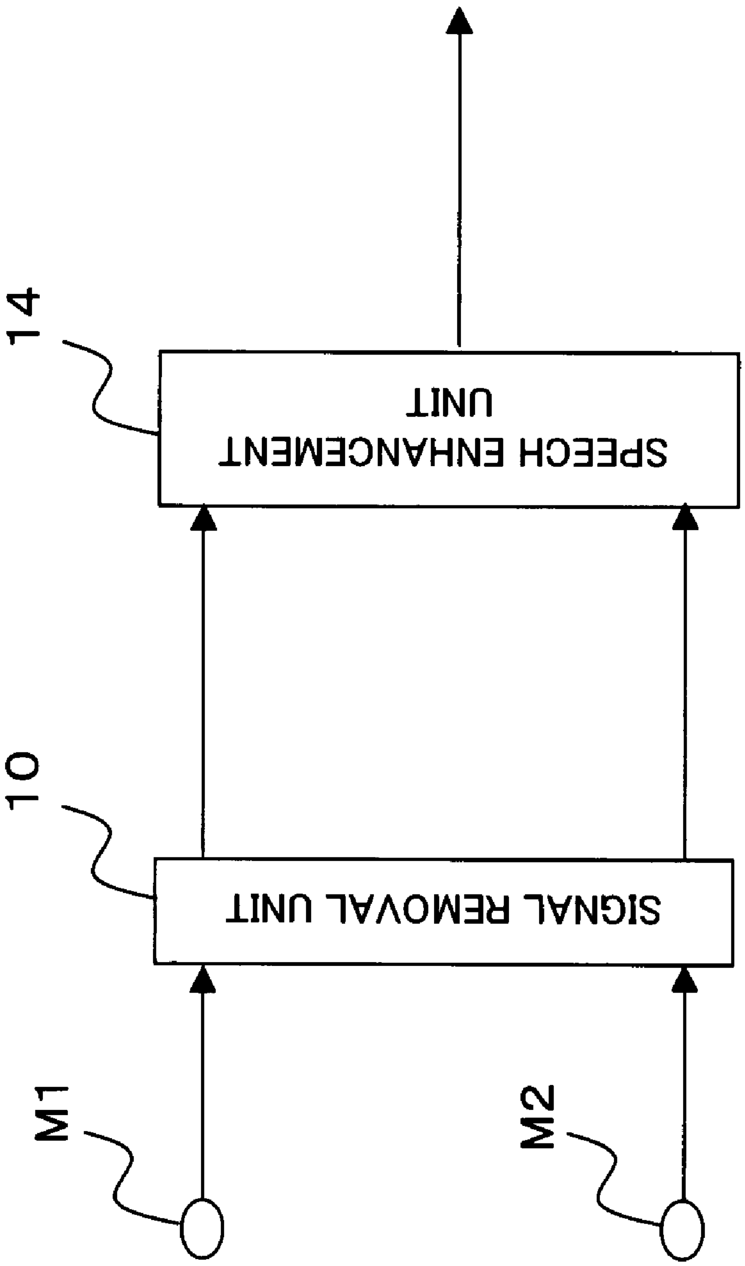
FIG. 9 is a block diagram showing the configuration of a speech (voice) enhancement system relating to a ninth example of the present invention.

FIG. 9 is a block diagram showing the configuration of a speech enhancement system relating to a ninth example of the present invention. In FIG. 9, the speech enhancement system includes sensors M1 and M2, a signal removal unit 10, and a speech enhancement unit 14. The signal removal unit 10 is constituted by any one of the signal removal systems described in the first to fifth examples of the present invention. At least one of a signal-removed signal (or a signal-removed signal after the gain restored) outputted from the signal removal unit 10, sensor signals, sensor signals with adjusted gains, or the output signal of the beamformer 2 is received by the speech enhancement unit 14. Using these signals, the speech enhancement unit 14 emphasizes a voice from the direction from which the signal removed by the signal, removal unit 10 came.

In the present example, a voice coming from a particular direction can be accurately emphasized by providing the speech enhancement unit 14 at a stage subsequent to the signal removal unit 10. In other words, even when disturbing sounds with different powers come from various directions, a voice coming from the particular direction can be emphasized. The reason is that the signal removal unit 10 accurately removes a voice coming from the particular direction, and as a result, disturbing sounds (noises) coming from other directions can be inferred.

Tenth Example

Figure 13:
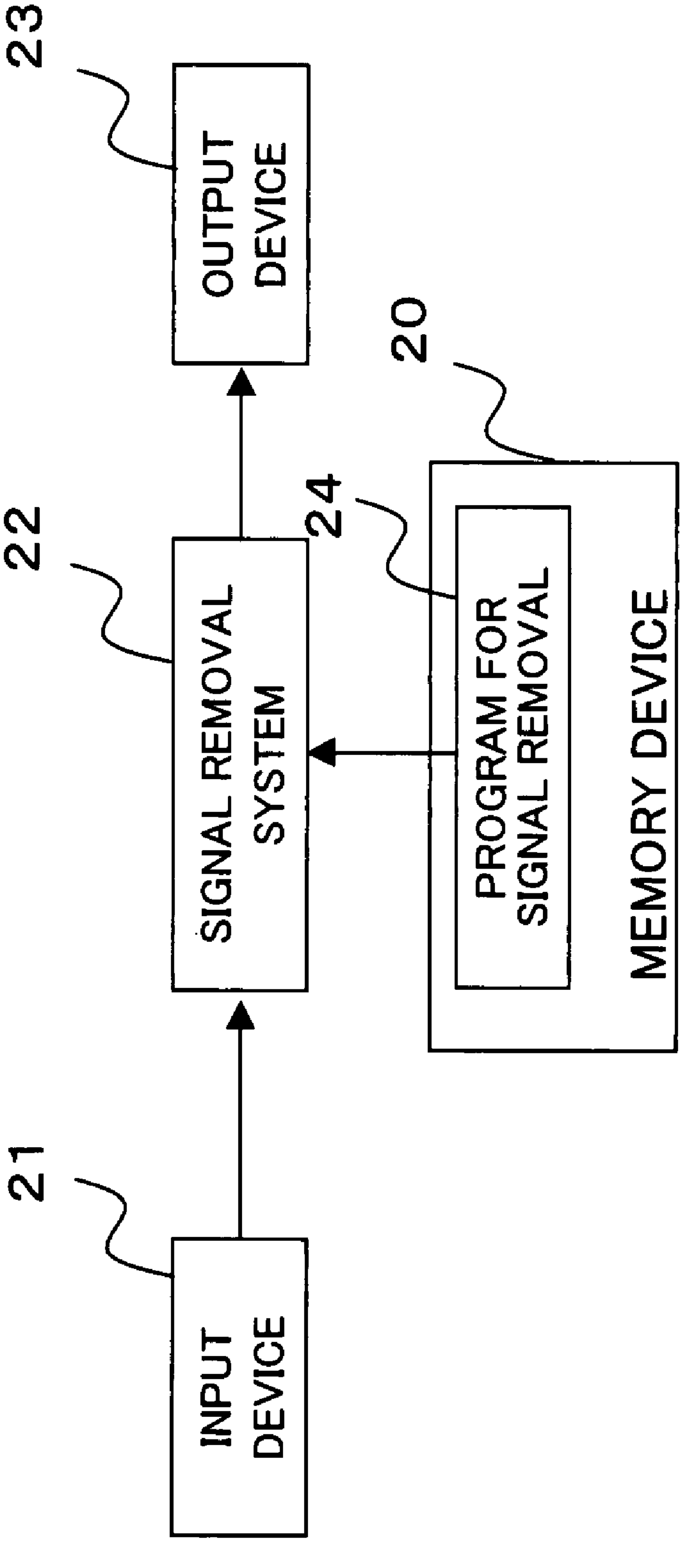
FIG. 13 is a block diagram showing the configuration of a signal removal system relating to a tenth example of the present invention.

FIG. 13 is a block diagram showing the configuration of a signal removal system relating to a tenth example of the present invention. In FIG. 13, the signal removal system includes a memory device 20, an input device 21, an output device 23, and a signal removal system 22 constituting any one of the signal removal systems of the first to fifth examples of the present invention described above. The signal removal system 22 is constituted by a CPU. Further, the input device 21 is a device that receives signals from the sensors or a device that files the signals from the sensors as data and reads these files. The output device 23 is a device that outputs the results of the processing by systems such as a display device and file device. In examples described below, the functions of these devices are the same.

A program 24 for signal removal, stored in the memory device 20, is read into the signal removal system 22 and controls the operation of the signal removal system 22, which is program-controlled. Controlled by the program 24 for signal removal, the signal removal system 22 executes the same processings as any one of the signal removal systems in the first to fifth examples of the present invention.

Eleventh Example

Figure 14:
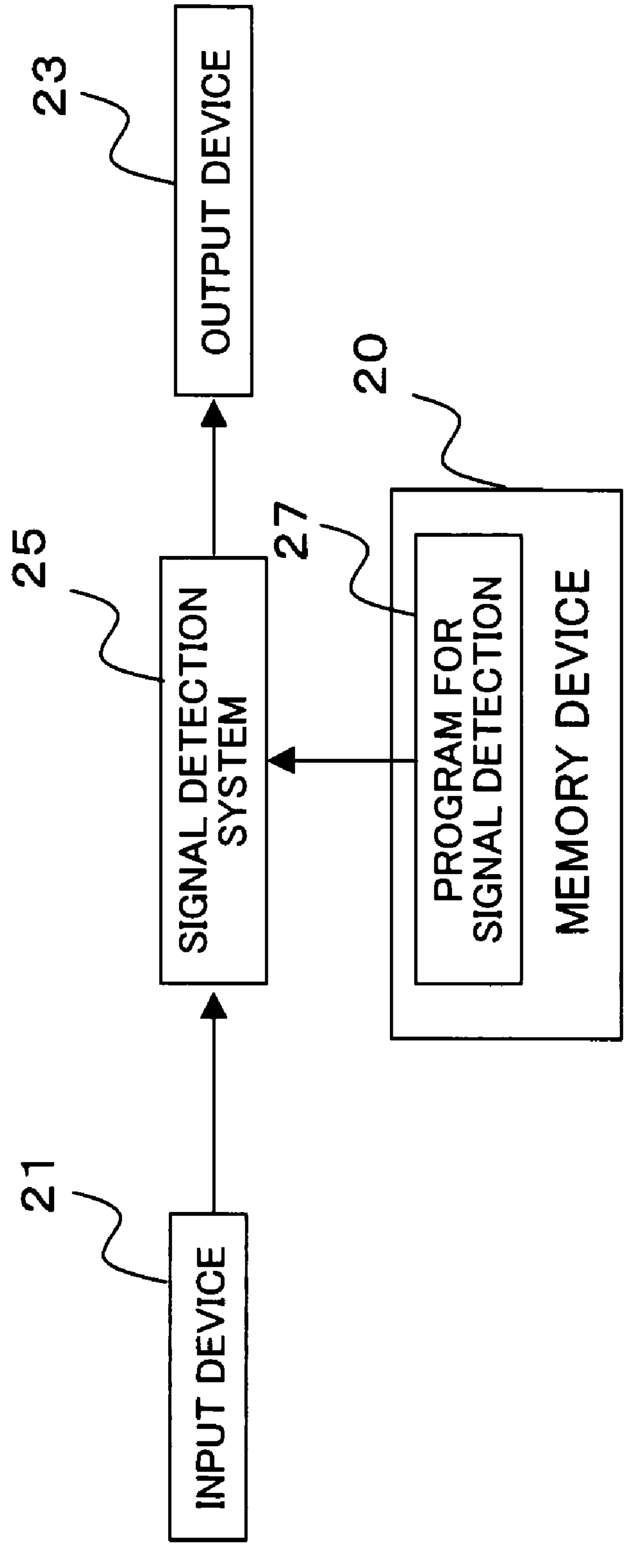
FIG. 14 is a block diagram showing the configuration of a signal detection system relating to an eleventh example of the present invention.

FIG. 14 is a block diagram showing the configuration of a signal detection system relating to an eleventh example of the present invention. In FIG. 14, the signal detection system includes a memory device 20, the input device 21, the output device 23, and a signal detection system 25 constituting the signal detection system of the sixth example of the present invention described above. The signal detection system 25 is constituted by a CPU.

A program 27 for signal detection, stored in the memory device 20, is read into the signal detection system 25 and controls the operation of the signal detection system 25, which is program-controlled. Controlled by the program 27 for signal detection, the signal detection system 25 executes the same processings as the signal detection system of the sixth example of the present invention.

Twelfth Example

Figure 15:
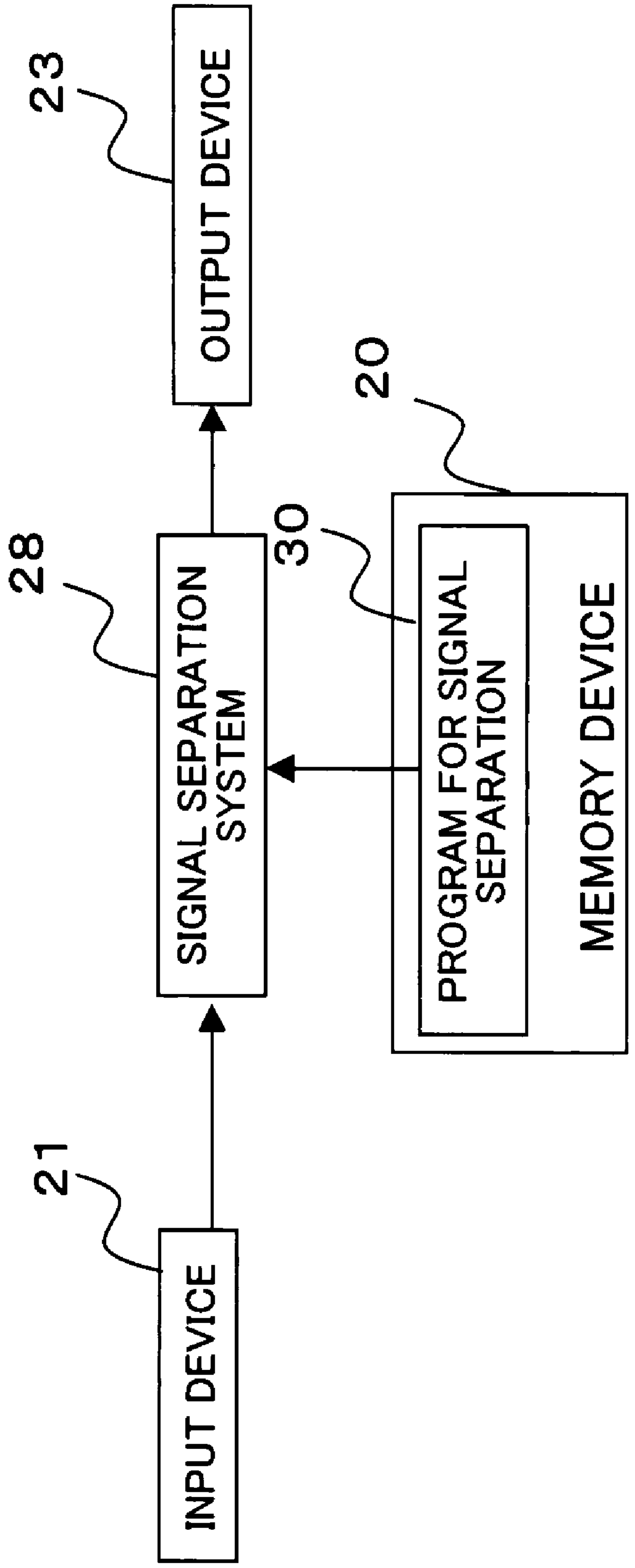
FIG. 15 is a block diagram showing the configuration of a signal separation system relating to a twelfth example of the present invention.

FIG. 15 is a block diagram showing the configuration of a signal separation system relating to a twelfth example of the present invention. In FIG. 15, the signal separation system includes a memory device 20, the input device 21, the output device 23, and a signal separation system 28 constituting the signal separation system of the seventh example of the present invention described above. The signal separation system 28 is constituted by a CPU.

A program 30 for signal separation, stored in the memory device 20, is read into the signal separation system 28 and controls the operation of the signal separation system 28, which is program-controlled. Controlled by the program 30 for signal separation, the signal separation system 28 executes the same processings as the signal separation system of the seventh example of the present invention.

Thirteenth Example

Figure 16:
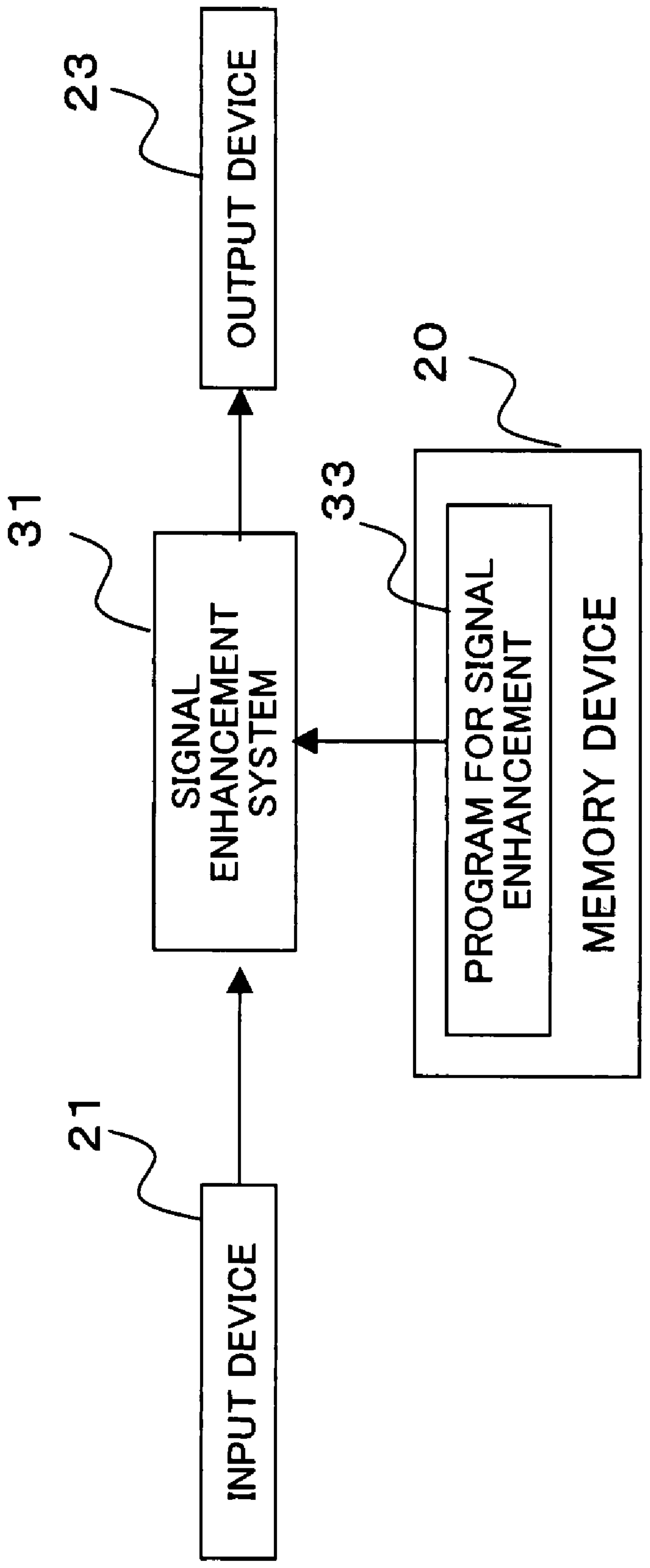
FIG. 16 is a block diagram showing the configuration of a signal enhancement system relating to a thirteenth example of the present invention.

FIG. 16 is a block diagram showing the configuration of a signal enhancement system relating to a thirteenth example of the present invention. In FIG. 16, the signal enhancement system includes a memory device 20, the input device 21, the output device 23, and a signal enhancement system 31 constituting the signal enhancement system of the eighth example of the present invention described above. The signal enhancement system 31 is constituted by a CPU.

A program 33 for signal enhancement, stored in the memory device 20, is read into the signal enhancement system 31 and controls the operation of the signal enhancement system 31, which is program-controlled. Controlled by the program 33 for signal enhancement, the signal enhancement system 31 executes the same processings as the signal enhancement system of the eighth example of the present invention.

Fourteenth Example

Figure 17:
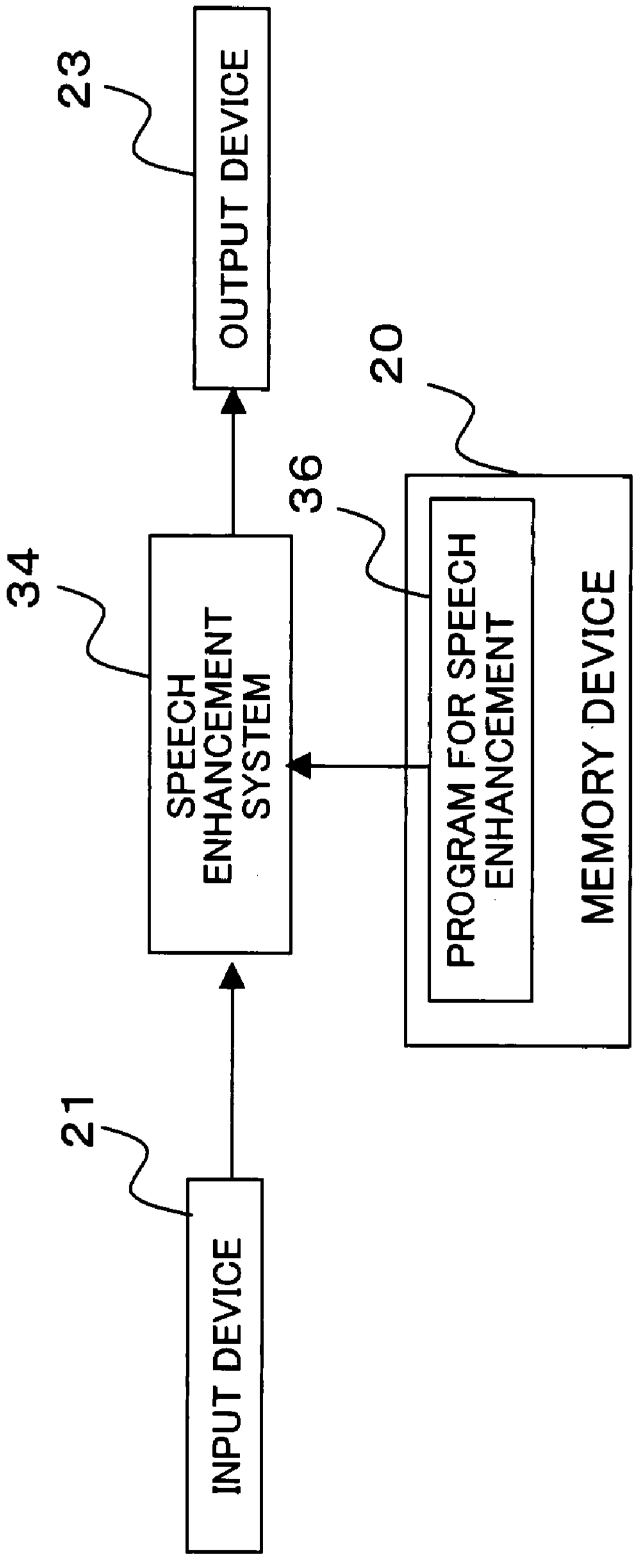
FIG. 17 is a block diagram showing the configuration of a speech enhancement system relating to a fourteenth example of the present invention.
Figure 18:
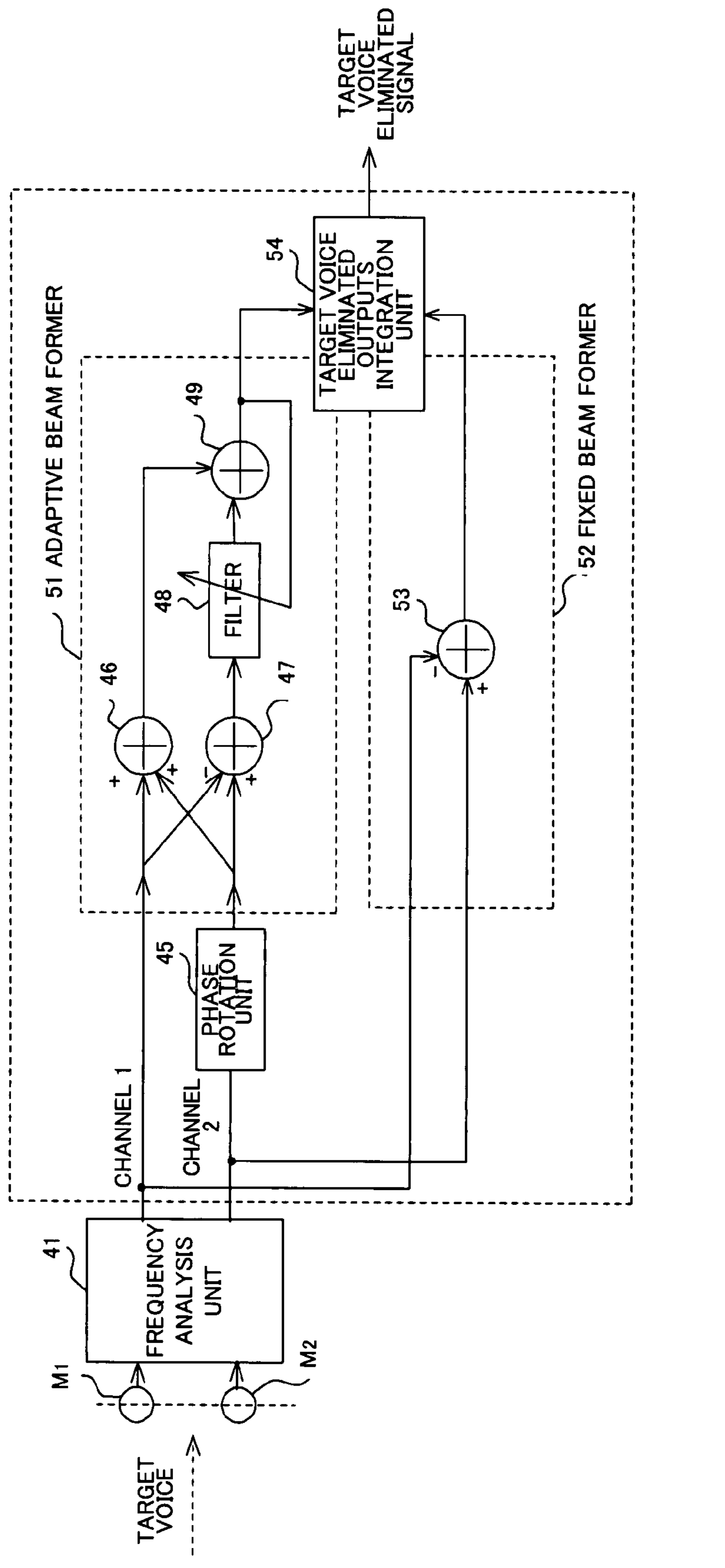
FIG. 18 CONVENTIONAL ART
FIG. 18 is a block diagram showing the configuration of a conventional noise suppression apparatus for speech recognition.

FIG. 17 is a block diagram showing the configuration of a speech enhancement system relating to a fourteenth example of the present invention. In FIG. 17, the speech enhancement system includes a memory device 20, the input device 21, the output device 23, and a speech enhancement system 34 constituting the speech enhancement system of the ninth example of the present invention described above. The speech enhancement system 34 is constituted by a CPU.

A program 36 for speech enhancement, stored in the memory device 20, is read into the speech enhancement system 34 and controls the operation of the speech enhancement system 34, which is program-controlled. Controlled by the program 36 for speech enhancement, the speech enhancement system 34 executes the same processings as the speech enhancement system of the ninth example of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

It is possible to apply the present invention not only to the removal of sound signal, but also to the removal of radio wave, electromagnetic wave, and optical (such as infrared radiation) signals.

INDUSTRIAL APPLICABILITY

The present invention can be applied to various applications removing a signal arriving at sensors from a particular direction from a plurality of spatially mixed signals.

The invention claimed is:

1. A signal removal method, wherein a signal removal device removes a signal arriving at sensors from a particular direction using signals from a plurality of sensors, comprising:

removing, using a first beamformer of the signal removal device, a signal coming from a particular direction by steering a null to the particular direction using signals from said plurality of sensors;

calculating a correction coefficient for correcting the gain of the spectrum of a signal output from one of said plurality of sensors according to the directivity characteristic of said first beamformer;

correcting the gain of the spectrum of the signal from said one sensor by said calculated correction coefficient; and reducing an output signal spectrum of said first beamformer by said corrected signal spectrum, wherein said process of calculating the coefficient for correcting the gain of the spectrum of the signal includes calculating the correction coefficient such that the gain at a direction within a range of said particular direction matches said first beamformer.

2. A signal separation method wherein signals arriving at sensors from a plurality of directions are separated by combining a plurality of the signal removal methods as defined in claim 1.

3. The signal removal method as defined in claim 1 wherein, when the spectrum of the signal output from said first beamformer is corrected, subtraction is performed on a remaining signal or signals after the removal by said first beamformer.

4. The signal removal method as defined in claim 1, further comprising adjusting the gains of said plurality of sensors frequency by frequency.

5. The signal removal method as defined in claim 1, wherein the processes other than said process in which the spectrum is corrected are processed in a time domain.

6. The signal removal method as defined in claim 1, further comprising restoring the gain of the signal with said corrected spectrum.

7. A signal detection method, wherein the presence of a signal arriving at sensors from a particular direction is detected according to a difference in power, correlation value, or distortion between a signal after a signal arriving at sensors from a particular direction is removed by the signal removal method as defined in claim 1 and said sensor signal or an output signal of said second beamformer.

8. A signal enhancement method wherein a signal arriving at sensors from a particular direction from which a signal removed by the signal removal method as defined in claim 1 came is enhanced using a signal after a signal arriving at sensors from a particular direction is removed by the signal removal method as defined in claim 1, and said sensor signal or the output signal of said second beamformer.

9. A speech enhancement method wherein the enhanced signal in the signal enhancement method as defined in claim 8 is a voice signal.

10. A signal removal method, wherein a signal removal device removes a signal arriving at sensors from a particular direction using signals from a plurality of sensors, comprising:

removing, using a first beamformer of the signal removal device, a signal coming from a particular direction by steering a null to the particular direction using signals from said plurality of sensors;

deriving a signal spectrum from the signals from the plurality of sensors using a second beamformer that forms a second directivity characteristic different from a first directivity characteristic of said first beamformer;

calculating a correction coefficient for correcting the gain of the spectrum of a signal output from said second beamformer according to said first directivity characteristic and said second directivity characteristic;

correcting the spectrum of the signal output from said second beamformer by said calculated correction coefficient; and reducing an output signal spectrum of said first beamformer by said corrected output signal spectrum of said second beamformer, wherein said process of calculating the coefficient for correcting the gain of the spectrum of the signal includes calculating the correction coefficient such that the gain at a direction within a range of said particular direction matches said first beamformer.

11. A signal removal device, which removes a signal arriving at sensors from a particular direction using signals from a plurality of sensors, comprising:

a first beamformer that removes a signal coming from a particular direction by steering a null to the particular direction using signals from said plurality of sensors;

a coefficient calculation unit that calculates a coefficient for correcting the gain of the spectrum of a signal output from one of said plurality of sensors according to the directivity characteristic of said first beamformer;

a gain correction unit that corrects the spectrum of the signal from said one sensor by said calculated correction coefficient; and a spectrum correction unit that reduces an output signal spectrum of said first beamformer by said corrected sensor signal spectrum, wherein said coefficient calculation unit calculates the correction coefficient such that the gain at a direction within a range of said particular direction matches said first beamformer.

12. A signal separation device, wherein the signal separation device separates signals arriving at sensors from a plurality of directions by combining a plurality of the signal removal devices as defined in claim 11.

13. The signal removal device as defined in claim 11 wherein said spectrum correction unit performs subtraction on a remaining signal or signals after the removal by said first beamformer.

14. The signal removal device as defined in claim 11 further comprising a gain adjustment unit that adjusts the gains of said plurality of sensors frequency by frequency.

15. The signal removal device as defined in claim 11 wherein processes other than at least a processes of said spectrum correction unit are performed in a time domain.

16. The signal removal device as defined in claim 11 further comprising a gain restoration unit that restores the gain of said signal with the corrected spectrum.

17. A signal detection device, wherein the signal detection device detects the presence of a signal arriving at sensors from a particular direction according to a difference in power, correlation value, or distortion between a signal after a signal arriving at sensors from a particular direction is removed by the signal removal device as defined in claim 11 and said sensor signal or the output signal of said second beamformer.

18. A signal enhancement device, wherein the signal enhancement device enhances a signal arriving at sensors from a particular direction from which a signal removed by the signal removal device as defined in claim 11 came using a signal after a signal arriving at sensors from a particular direction is removed by the signal removal device as defined in claim 11, and said sensor signal or the output signal of said second beamformer.

19. A speech enhancement device, wherein the signal enhanced by the signal enhancement device as defined in claim 18 is a voice signal.

20. A signal removal device, which removes a signal arriving at sensors from a particular direction using signals from a plurality of sensors, comprising:

a first beamformer that removes a signal coming from a particular direction by steering a null to the particular direction using signals from said plurality of sensors;

a second beamformer that forms a second directivity characteristic different from a first directivity characteristic of said first beamformer;

a coefficient calculation unit that calculates a coefficient for correcting the gain of the spectrum of a signal output from said second beamformer according to said first directivity characteristic and said second directivity characteristic;

a gain correction unit that corrects the spectrum of the signal outputted from said second beamformer by said calculated correction coefficient; and a spectrum correction unit that reduces an output signal spectrum of said first beamformer by said corrected output signal spectrum of said second beamformer, wherein said coefficient calculation unit calculates the correction coefficient such that the gain at a direction within a range of said particular direction matches said first beamformer.

21. An article of manufacture including a non-transitory computer-readable medium having instructions stored thereon that, if executed by a computing device, cause the computing device to perform operations comprising:

causing a first beamformer to remove a signal coming from a particular direction by steering a null to the particular direction using signals from a plurality of sensors;

calculating a coefficient for correcting the gain of the spectrum of a signal output from one of said plurality of sensors according to the directivity characteristic of said first beamformer;

correcting the gain of the spectrum of the signal from said one sensor by said calculated correction coefficient; and reducing an output signal spectrum of said first beamformer by said corrected signal spectrum, wherein said process of calculating the coefficient for correcting the gain of the spectrum of the signal includes calculating the correction coefficient such that the gain at a direction within a range of said particular direction matches said first beamformer.

22. An article of manufacture including a non-transitory computer-readable medium having instructions stored thereon that, if executed by a computing device, cause the computing device to perform operations comprising:

separating signals arriving at sensors from a plurality of directions by combining a plurality of the operations as defined in claim 21.

23. The article of manufacture as defined in claim 21 wherein, when the spectrum of the signal output from said first beamformer is corrected, subtraction is performed on a remaining signal or signals after the removal by said first beamformer.

24. The article of manufacture as defined in claim 21, wherein the operations further comprise: adjusting the gains of said plurality of sensors frequency by frequency.

25. The article of manufacture as defined in claim 21, wherein operations other than said operation in which the spectrum is corrected are performed in a time domain.

26. The article of manufacture as defined in claim 21, wherein the operations further comprise: restoring the gain of the signal with said corrected spectrum.

27. An article of manufacture including a non-transitory computer-readable medium having instructions stored thereon that, if executed by a computing device, cause the computing device to perform operations comprising:

detecting the presence of a signal arriving at sensors from a particular direction according to a difference in power, correlation value, or distortion between a signal after a signal arriving at sensors from the particular direction is removed in the manner defined in claim 21 and said sensor signal or the output signal of said second beamformer.

28. An article of manufacture including a non-transitory computer-readable medium having instructions stored thereon that, if executed by a computing device, cause the computing device to perform operations comprising:

enhancing a signal arriving at sensors from a particular direction from which a signal removed by the operations as defined in claim 21 came using a signal after a signal arriving at sensors from a particular direction is removed by the operations as defined in claim 21, and said sensor signal or the output signal of said second beamformer.

29. An article of manufacture as defined in claim 28, wherein the signal enhanced is a voice signal.

30. An article of manufacture including a non-transitory computer-readable medium having instructions stored thereon that, if executed by a computing device, cause the computing device to perform operations comprising:

causing a first beamformer to remove a signal coming from a particular direction by steering a null to the particular direction using signals from a plurality of sensors;

deriving a signal spectrum from the sensor signals of said plurality of sensors using a second beamformer that forms the second directivity characteristic different from a first directivity characteristic of said first beamformer;

calculating a coefficient for correcting the gain of the spectrum of a signal output from said second beamformer according to said first directivity characteristic and said second directivity characteristic;

correcting the spectrum of the signal output from said second beamformer by said calculated correction coefficient; and reducing an output signal spectrum of said first beamformer by said corrected output signal spectrum of said second beamformer, wherein said process of calculating the coefficient for correcting the gain of the spectrum of the signal includes calculating the correction coefficient such that the gain at a direction within a range of said particular direction matches said first beamformer.

* * * * *